United States Patent [19]

Riley et al.

[11] Patent Number: 5,838,993
[45] Date of Patent: Nov. 17, 1998

[54] SYSTEM FOR DMA CONTROLLER SHARING CONTROL SIGNALS IN CONVENTIONAL MODE AND HAVING SEPARATE CONTROL SIGNALS FOR EACH NUMBER OF CHANNELS IN DISTRIBUTED MODE

[75] Inventors: Dwight D. Riley; Robert C. Elliott, both of Houston, Tex.

[73] Assignee: Compaq Computer Corporation, Houston, Tex.

[21] Appl. No.: 639,879

[22] Filed: Apr. 26, 1996

Related U.S. Application Data

[63] Continuation-in-part of Ser. No. 570,394, Dec. 11, 1995, Pat. No. 5,774,680.

[51] Int. Cl.$^6$ .................................................. G06F 13/20
[52] U.S. Cl. ............................................................. 395/842
[58] Field of Search .................................. 395/309, 834, 395/842; 711/217

[56] References Cited

U.S. PATENT DOCUMENTS

| | | | |
|---|---|---|---|
| 5,590,377 | 12/1996 | Smith ....................................... | 395/842 |
| 5,608,889 | 3/1997 | Werlinger et al. ...................... | 711/217 |
| 5,621,902 | 4/1997 | Cases et al. ............................. | 395/309 |
| 5,673,400 | 9/1997 | Kenny ..................................... | 395/309 |
| 5,685,012 | 11/1997 | Klein ....................................... | 395/834 |

OTHER PUBLICATIONS

Intel® 8237A High Performance Programmable DMA Controller (8237A, 8237A-4, 8237A-5); Oct. 1987 (pp. 2-222—2-258).

PCI, Revision 2.1, A100910-940 (pp. 35–55); Jun. 1, 1995.

DMA Support on the "PCIway", Aug. 2, 1995, Version 5.4, Preliminary, pp. 2–16.

*Primary Examiner*—Thomas C. Lee
*Assistant Examiner*—Anderson I. Chen
*Attorney, Agent, or Firm*—Pravel, Hewitt & Kimball

[57] ABSTRACT

A distributed direct memory access (DMA) architecture where DMA controllers are modified to create isolated DMA channels. Each isolated channel includes its own set of uniquely addressable registers which provide functional compatibility with conventional DMA controllers. A DMA master interacts compatibly with the computer system and transparently communicates special cycles to the isolated DMA channels to cause the distributed DMA architecture to appear as the DMA controllers. The DMA master spawns special cycles to the isolated channels for sharing common write data with multiple channels and merging read data into a single DMA controller compatible register. Channel 4 cascading is also handled via tracking registers and special cycles to maintain disable and masking functionality of channel 4 as it effects channels 0–3.

28 Claims, 25 Drawing Sheets

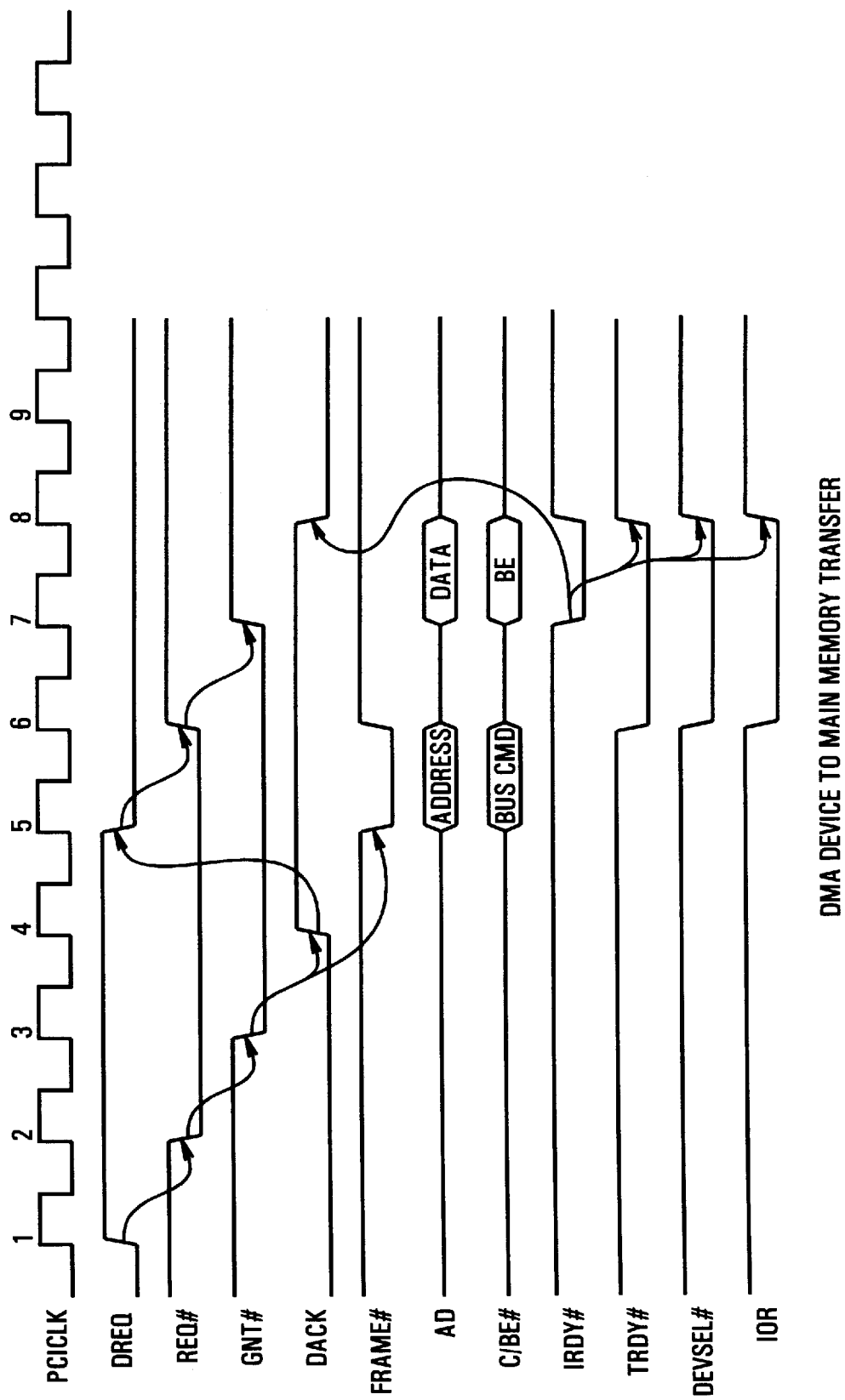
FIG. 8  DMA DEVICE TO MAIN MEMORY TRANSFER

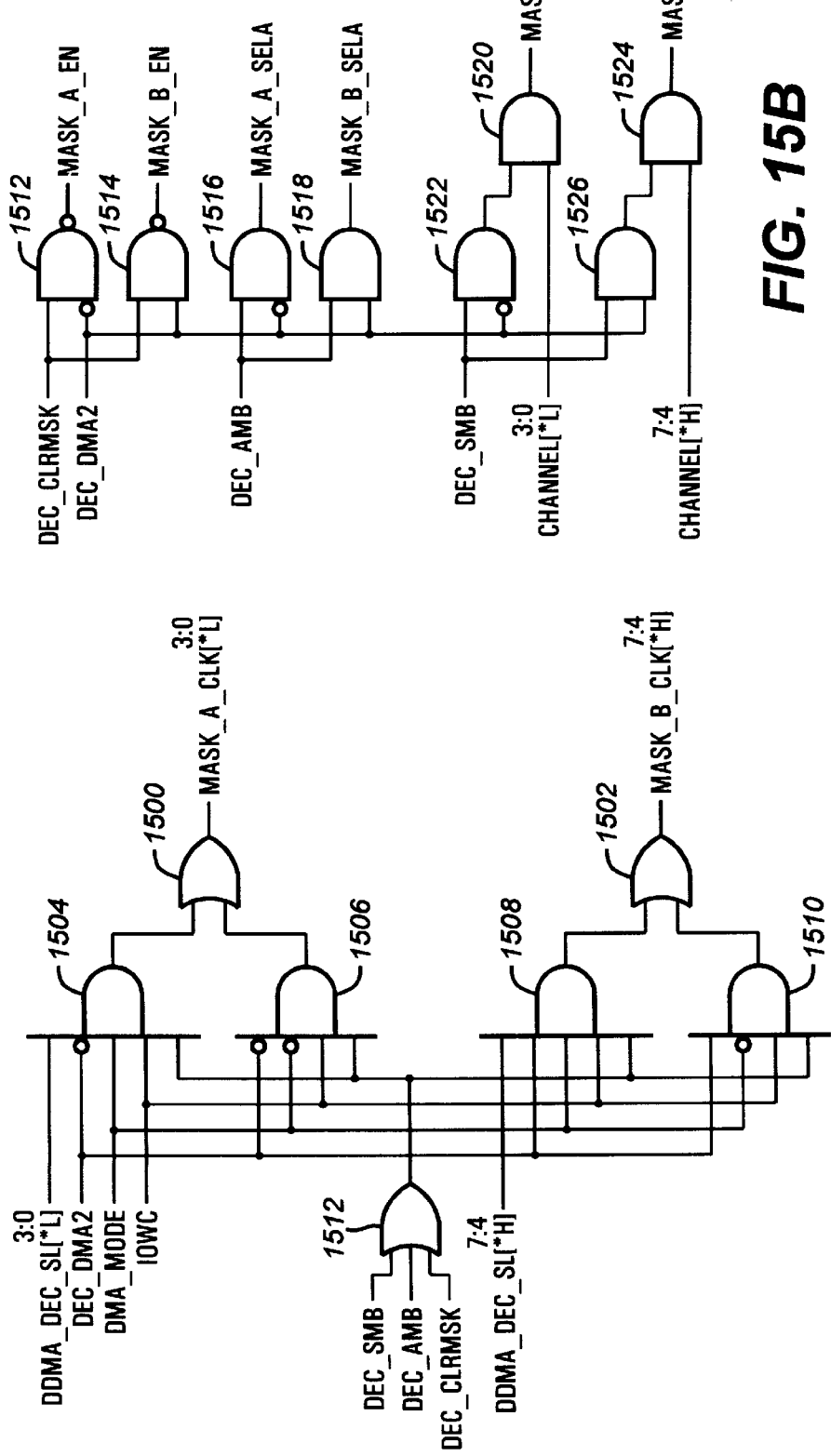

SYSTEM FOR DMA CONTROLLER SHARING CONTROL SIGNALS IN CONVENTIONAL MODE AND HAVING SEPARATE CONTROL SIGNALS FOR EACH NUMBER OF CHANNELS IN DISTRIBUTED MODE

This is a continuation in part of prior copending application Ser. No. 08/570,394 filed Dec. 11, 1995 now U.S. Pat. No. 5,774,680.

BACKGROUND OF THE INVENTION

1. Field of the Invention

The invention relates to a method and apparatus of interfacing a direct memory access (DMA) controller to a non-ISA bus and more particularly to utilizing a personal computer (PC) compatible DMA controller in a distributed DMA architecture on non-ISA buses, especially the PCI bus.

2. Description of the Related Art

Personal computers are constantly changing as new technologies evolve and are incorporated into the computer. Performance improvements in microprocessors and memory have resulted in computers so powerful that they can perform tasks that before could only be performed by large mainframe computers. However, to fully replace a mainframe computer, the computer must have significant memory and storage capacity supported by a hearty I/O (input/output) subsystem.

Several standardized I/O buses are available to the system designer including: ISA (Industry Standard Architecture), EISA (Extended Industry Standard Architecture), PCI (Peripheral Component Interface), and VESA (Video Electronics Standards Association) local bus sometimes called VL-bus or VLB. Today's computers are typically designed with a PCI bus with either an ISA bus or EISA bus. Familiarity with the PCI Local Bus Specification, Production Version, Revision 2.1, dated Jun. 1, 1995, which is published by the PCI Special Interest Group of Hillsboro, Oreg., is assumed for the purposes of this application, and it is hereby incorporated by reference.

When an ISA or EISA bus is present standard I/O peripherals, such as a floppy disk, are connected to the ISA or EISA bus. This is particularly relevant since the floppy disk is a peripheral which uses direct memory access (DMA).

Direct memory access is a method by which a peripheral may access memory without processor intervention, provided the DMA transfer was previously initialized. DMA transfers are normally used to transfer blocks of data between an I/O device, such as the floppy disk controller, and memory. Direct memory access reduces the amount of processor interactions with memory, thereby freeing the processor for other processing tasks.

The legacy of the IBM (International Business Machines) AT class personal computer (PC) dictates that compatible computer systems include two DMA controllers on the ISA bus. These DMA controllers are functionally compatible with an 8237 DMA controller made by Intel and other companies. The DMA controllers conventionally reside in the personal computer at certain address ranges. Although more recently it is common to combine the functionality of the DMA controller with other functions traditionally found on the ISA bus into a single integrated circuit to conserve circuit board space, the DMA controller is still present at the compatible address ranges. A representative description of the DMA controller is found in the 8237A High Performance Programmable DMA Controller datasheet published by Intel Corporation, and hereby incorporated by reference. Technical data regarding the implementation of DMA controllers in a PC can be found in technical literature such as the Compaq Deskpro 386 Personal Computer Technical Reference Guide, Volume I, chapter 2, hereby incorporated by reference. Familiarity with the DMA controller is assumed.

The DMA controller is a peripheral interface circuit for allowing peripheral devices to directly transfer data between main memory. It includes four independent channels and may be expanded to any number of channels by cascading additional controller chips. In the PC architecture, two DMA controllers are used. One DMA controller is used for byte transfers, and the second DMA controller is user for word (16-bit) transfers. All four channels (designated 0, 1, 2 and 3) of the byte-wide DMA controller are dedicated to performing byte DMA operations. Of the four channels (designated 4, 5, 6 and 7) of the word-wide DMA controller, channels 5, 6 and 7 are dedicated for word DMA operations. Channel 4 is used for cascading the two controllers together and, therefore, is not available for normal DMA. Because the byte-wide DMA controller is cascaded into the word-wide DMA controller, the byte-wide DMA controller is sometimes called the secondary DMA controller and the word-wide DMA controller is called the primary DMA controller.

The ISA and EISA buses include signals for performing DMA operations. A peripheral connected to the ISA bus may request a DMA operation by providing a DMA request signal (DREQ*, where * is the channel number) over the ISA bus to the DMA controller. In response to a DREQ signal, the DMA controller will provide a DMA acknowledge (DACK*) signal to the peripheral when the DMA controller has been granted the ISA bus and is ready to perform the operation. The DMA controller then accesses the peripheral to move data over the ISA bus and between the peripheral and memory. However, since the PCI bus or the VL-bus do not incorporate the ISA DMA signals, ISA DMA devices cannot be placed on these buses.

With the PCI bus becoming more popular because of its higher performance, it is desirable to connect many of the ISA peripherals directly to the PCI bus instead of the ISA bus. However, the incompatibility between the ISA DMA controller architecture and the PCI bus prevents the joining of these components.

In certain systems, such as portable computers, the limited space requirements allow only one expansion bus to be supported. If only the PCI bus is provided and the ISA bus is not, then ISA DMA capability is not directly supported. One method of supporting the ISA DMA operations is to include the DMA controllers in a single PCI device. However, all DMA devices must connect to this single device, so essentially the ISA bus must be present. Another alternative is to place the DMA controllers on the PCI bus. The special DMA signals can then be routed as sideband signals without interfering with PCI operations. However, with the advent of Plug and Play, any function that supports DMA should be programmable to more than one channel without the use of jumpers, and therefore, the relatively high number of sideband signals (fourteen DREQ* and DACK* signals) cause this solution to be unworkable, especially for portable applications. Familiarity with the Plug and Play Specification hereby incorporated by reference, available from Microsoft Corporation, is assumed for the purposes of this application.

Moreover, the DMA signals could be serialized to reduce pinouts, but then response time on the negative edge of the DREQ* signals might lead to late terminations. Therefore, this solution is not preferred.

The performance of the PCI bus is much greater than that of the ISA and EISA buses. Further, by not providing a PCI to ISA bridge chip costs can be reduced. As such, it is desirable to create a mechanism for incorporating ISA type DMA into devices that connect directly to the PCI bus or VL-bus so that a more flexible solution to ISA DMA can be provided for portable computers.

SUMMARY OF THE PRESENT INVENTION

A distributed direct memory access (DDMA) architecture for a non-ISA bus computer system is disclosed. The distributed DMA architecture includes a DMA master and at least one DMA slave channel. Each DMA slave channel provides the functionality of one channel of a conventional DMA controller. The DMA slave channels are isolated from each other so that they can be individually coupled with particular input/output (I/O) devices requiring DMA transfers. The integration of DMA slave channels with the I/O devices provides a more tightly integrated DMA architecture in which DMA requests signaled over a bus are unnecessary.

Each DMA slave channel includes a set of registers for initializing and programming the channel for DMA transfers. Each of the registers are located at an offset from a unique base address. Each DMA slave channel includes a configuration register for programming the base address. The DMA master includes corresponding configuration registers for holding the unique base addresses of each of the DMA slave channels.

The conventional DMA controllers have channels assigned to logical channel numbers according to PC conventions, such as channels 0–7. The DMA master is responsible for tracking the logical channel assignments. However, communications with the DMA slave channels are performed according to the unique base addresses. Hence, the DMA slave channels are unaware of logical channel assignments, since they respond according to the unique base address.

The conventional DMA controllers of the ISA bus are logically located at certain addresses the computer. In the distributed DMA architecture, software compatibility with these addresses is maintained by the DMA master. The DMA master is coupled to a non-ISA bus, such as a PCI bus, in one of two configurations. In one variation, the DMA master is located between the processor, or requesting PCI agent, and the PCI bus where it receives cycles before they are passed to the PCI bus. In another variation, the DMA master is coupled to the PCI bus where cycles are positively claimed after they are received onto the PCI bus. Operations intended for the conventional DMA controllers of the ISA bus are claimed by the DMA master before the DMA controllers have an opportunity to receive them. The DMA master then decodes the operation to determine which DMA controller is targeted; schedules one or more operations to the DMA slave channels; and encodes and provides the operations to the individual DMA slave channels. If results are expected, such as in the case of a status register read operation, the DMA master receives the results from the individual DMA slave channels; merges the results, if necessary, into a temporary register; and provides the merged data from the temporary register as results back to the processor as though they were sent from the conventional DMA controllers. If conventional DMA controllers are present on the ISA bus, the DMA master is responsible for masking or disabling DMA channels of the conventional DMA controllers to avoid conflicts with the DMA slave channels. The above sequence includes a retry operation if the DMA master is coupled to the PCI bus for receiving the PCI cycles.

In the distributed DMA architecture, channel 4 cascading of channels 0–3 is supported via a set of tracking registers in the DMA master. Each DMA slave channel includes a tracking register for storing changes to the mask and command registers. Changes to the mask or command registers of those DMA channels assigned to channels 0–4 are stored in the tracking registers corresponding to DMA slave channels assigned to channels 0–4. The DMA master uses these register to restore the condition of channels 0–3 after channel 4 is unmasked or enabled. For example, if channel 4 is masked, the DMA master changes the tracking register of channel 4 and causes mask operations to channels 0–3. The state of the mask bits of channels 0–3 prior to the channel 4 mask event is stored in the tracking registers. While channel 4 is masked, any masking changes to channels 0–3 are stored in their respective tracking registers. If channel 4 is unmasked, the DMA master restores the mask registers of channels 0–3 from their respective tracking registers. Thus, channels 0–3 are unmasked or enabled if they were masked or disabled only due to a previous operation to mask or disable channel 4.

A method and apparatus for upgrading computer systems not having distributed DMA is disclosed. A PCI card including the present invention may co-exist in a system having only conventional DMA controllers if cycles to the conventional DMA controllers are claimed subtractively, such as in a PCI to ISA bridge. All operations to the conventional DMA controllers are intercepted by the DMA master. In this way the DMA master can provide compatibility with the conventional DMA controller, as described above, and assure that any commands never unmask or enable any channels that are claimed by the DMA slave channel of the PCI card. Upon receipt of a conventional DMA controller operation, the DMA master: claims the cycle; forces the processor to retry the cycle; spawns off cycles to the conventional DMA controller and DMA slave channel; and gathers the result, if necessary. After the spawned off cycles are complete, the DMA master waits for the requesting PCI agent to retry the operation, thereby providing compatible DMA input/output cycles. Thus, the method is similar to that described above where the DMA master is coupled to the PCI bus and cycles are positively claimed after they are received onto the PCI bus.

More than seven DMA channels is supported by means of a paging or swapping scheme. When DMA requests are received by an operating system or driver software, the software determines if the requested channel is available. If not, the software swaps out one of the seven available channels for the requested channel by one of two methods. In one method, DMA slave channels are configured with identical base addresses. By using either the command register enable bit or a configuration register enable bit, the operating system assures that only one channel is enabled at a time. In another method, each DMA channel is given a unique base address. The DMA master communicates to the DMA slave channels according to seven unique base addresses stored in its configuration registers. By replacing the contents of the configuration registers, the operating system can allow the DMA master to address different sets of seven DMA slave channels. This technique can also be applied for interrupt driven DMA services.

By using this novel method and structure of separate and independent DMA slave channels, individual DMA channels can be distributed among the input/output devices requiring DMA transfers, thereby supporting DMA on the PCI bus without requiring any change to existing software.

BRIEF DESCRIPTION OF THE DRAWINGS

A better understanding of the present invention can be obtained when the following detailed description of the preferred embodiment is considered in conjunction with the following drawings, in which:

FIG. 8 is a timing diagram illustrating a DMA operation between an I/O device and main memory according to the preferred embodiment;

FIGS. 15A–15E are schematic diagrams illustrating the mask register of FIG. 5 according to the preferred embodiment.

DETAILED DESCRIPTION OF THE PREFERRED EMBODIMENT

Figure 1A:
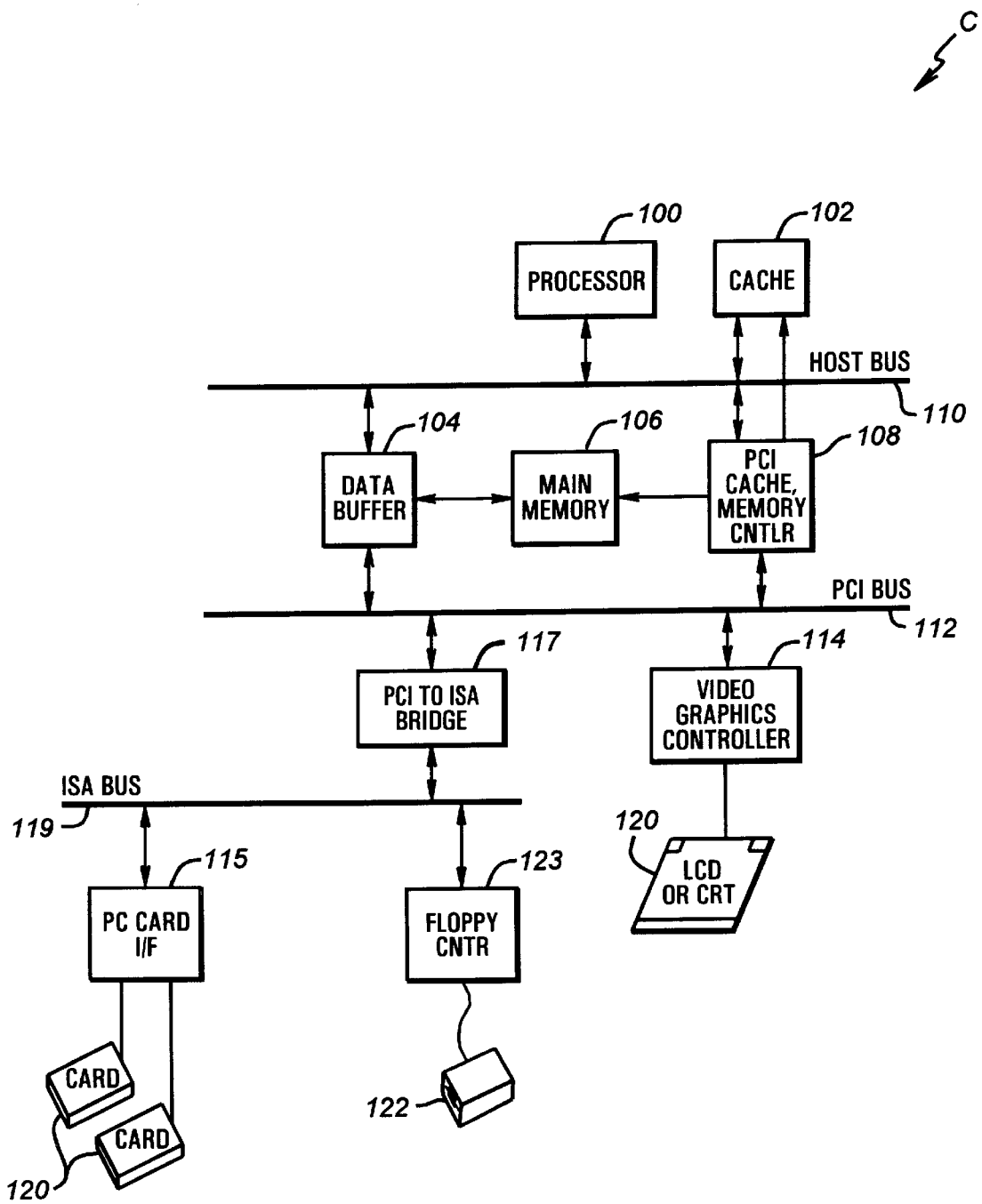
FIG. 1A is a block diagram illustrating a prior art computer system C incorporating DMA devices on the ISA bus.

To appreciate the novel features of the present invention, it is useful to first examine a computer system of the prior art. Referring to FIG. 1A, there is illustrated a computer system C of the prior art having conventional direct memory access (DMA) support from an ISA bus 119. The computer system C includes a processor 100, such as a 486, Pentium® or 586 class processor coupled to a host bus 110. Also coupled to the host bus 110 are a high speed memory cache 102, a PCI/cache/memory controller 108, and a data buffer 104.

The PCI/cache/memory controller 108 is further coupled to a main memory 106 and a peripheral component interconnect (PCI) bus 112 for controlling transfers between the processor 100/cache 102 and main memory 106; the processor 100 and the PCI bus 112; and between the PCI bus 112 and the main memory 106. The data buffer 104 provides a data path between the processor 100/cache 102 and main memory 106; a data path between the processor 100 and the PCI bus 112; and a data path between the PCI bus 112 and the main memory 106.

A number of PCI devices, such as a PCI video graphics controller 114 may be coupled directly to the PCI bus 112. The PCI video graphics controller 114 shown provides control and an interface to either a liquid crystal display (LCD) or cathode ray tube (CRT) monitor 120. A PCI/ISA bridge 117 is coupled to the PCI bus 112 for providing an interface to the ISA bus 119. The PCI/ISA bridge 117 includes conventional logic for allowing the PCI/ISA bridge 117 to perform as a PCI master or slave; a conventional ISA interface including master and slave logic and data buffers to isolate the PCI bus 112 from the ISA bus 119; and ISA support logic such as PCI and ISA arbitration logic, two 8259 compatible interrupt controllers, a 16-bit basic I/O services (BIOS) timer, three programmable timers/counters and non-maskable (NMI) control logic; and two cascaded 8237 compatible DMA controllers 202 and 204 (FIG. 1B), hereinafter referred to as conventional DMA controllers 200. The functions provided by the PCI/ISA bridge 114 are desirable in order to remain compatible with the early personal computer. The ISA bus 119 also supports a number of standard PC peripherals, such as serial ports, parallel ports and hard disks, which are not shown here for simplicity. The conventional DMA controller 200 provides certain ISA bus peripherals the ability to directly transfer data to or from main memory 106. One such peripheral is a floppy drive system, as illustrated by the floppy controller 120 coupled to a floppy drive 122. In an IBM compatible PC, the floppy controller 120 is coupled to a channel 2 of the DMA controllers 216 for performing the DMA transfers. In this prior art design, since the conventional DMA controllers 200 reside on the ISA bus 119 for compatibility reasons, and since the PCI bus does not support the ISA DMA, DMA utilizing devices such as the floppy controller 120, may not be coupled to the PCI bus 112 without incorporating a number of sideband signals for DMA request and acknowledge signals. The same is true of cards 120, if they require DMA. The sideband signals are especially undesirable since they require extra connector pins, if connecting through a connector.

Figure 1B:
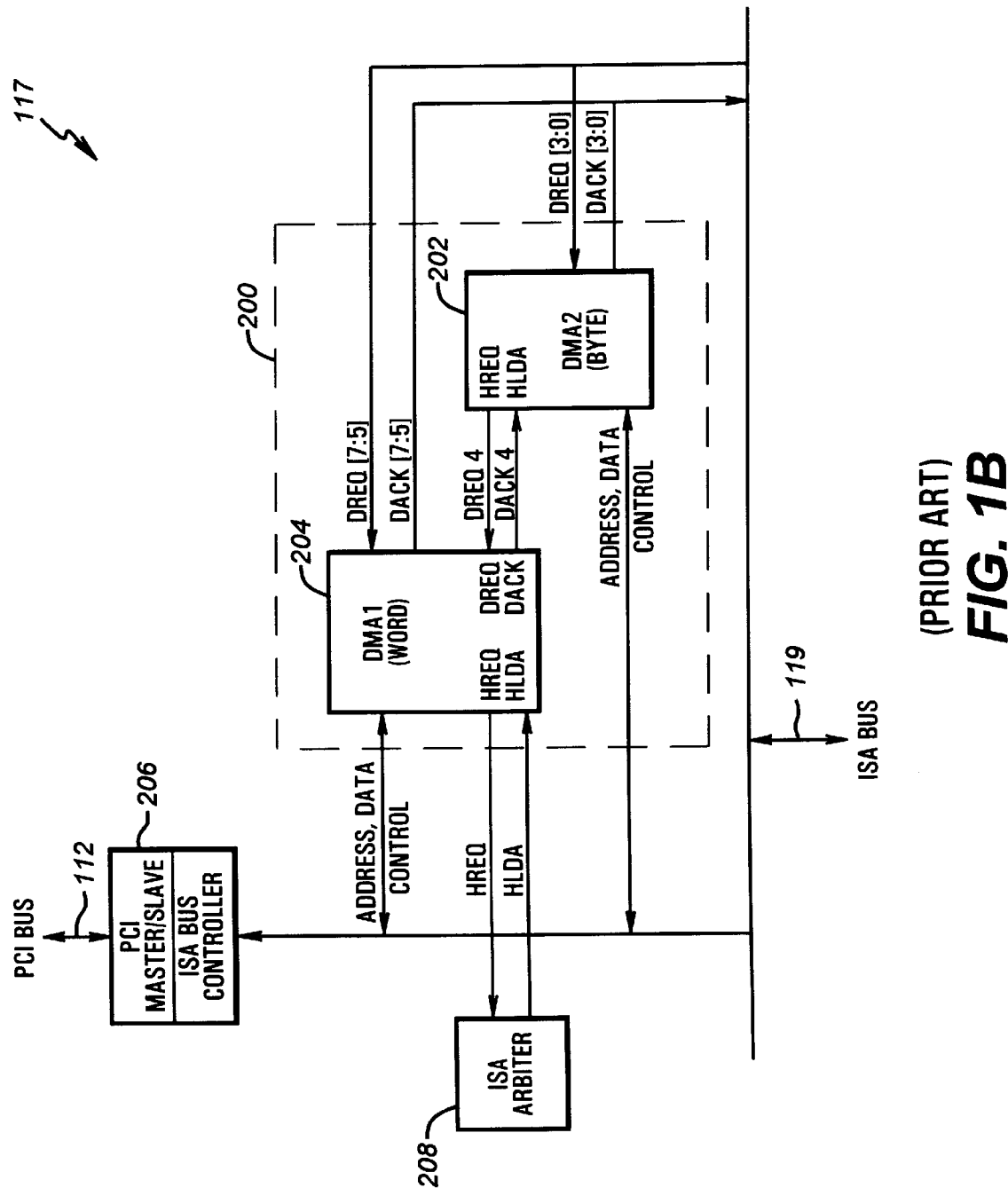
FIG. 1B is a block diagram illustrating the prior art DMA controller of FIG. 1A.

Now turning now to FIG. 1B, there is illustrated a more detailed block diagram of the PCI/ISA bridge 117. The PCI/ISA bridge 117 contains the conventional DMA controller 200, which is comprised of two cascaded 8237 compatible DMA controllers 202 and 204. Each DMA controller 202 and 204 have four channels for performing DMA transfers. A first or primary DMA controller 204 handles word-wide transfers on channels conventionally called channels 5–7. The primary DMA controller 204 is connected to a second or secondary DMA controller 202 in a cascaded fashion through one channel (channel 4) of the primary DMA controller 204, thereby rendering channel 4 unusable for DMA transfers. The secondary DMA controller 202 handles byte-wide transfers on channels conventionally called channels 0–3. The conventional DMA controller 200 is coupled to an ISA bus controller 206 which is coupled to the PCI bus 112 as a bridge. An ISA arbiter 208 receives ISA bus master request signals, such as HREQ, for awarding control of the ISA bus 119. Thus, the conventional DMA controller 200 resides on the ISA bus 119 and the ISA cycles must be transferred through the ISA bus controller and PCI master slave 206 to get to the PCI bus 112.

Figure 2:
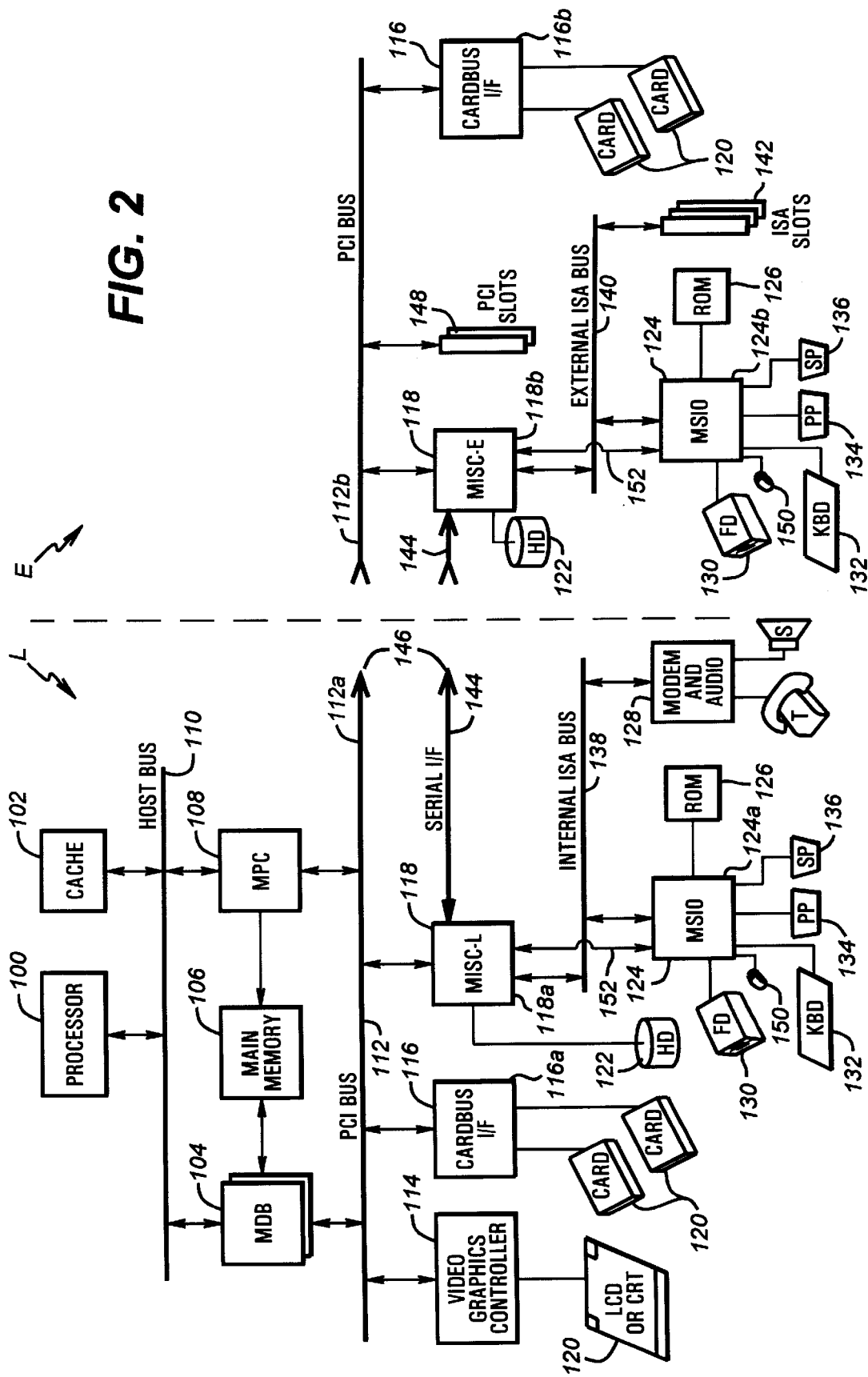
FIG. 2 is a block diagram illustrating a computer system incorporating DMA devices on the PCI bus according to the preferred embodiment.

Referring now to FIG. 2, there is illustrated a block diagram of a computer system utilizing the present invention. According to the present invention, input/output devices requiring DMA support are coupled to the PCI bus 112 in a novel distributed DMA architecture, as disclosed herein.

The computer system is shown divided into a laptop portion L (hereinafter laptop computer L) and an expansion base unit portion E (hereinafter expansion base E). The laptop computer L is an operationally autonomous apparatus which is detachable from the expansion base E for remote computing operations. While the laptop computer L is docked into the expansion base E, the laptop computer L operates on AC power and while the computer L is detached from the expansion base E the laptop computer L operates from battery power. Mechanisms are also provided to operate the laptop computer from AC power while removed from the expansion base E. The expansion base E typically provides expandability for functions not included in the laptop portion L.

As can be seen, the devices connecting to the host bus 110 are similar to the devices illustrated in FIG. 1A. A processor 100 is provided in the laptop computer L which is a conventional microprocessor such as an Intel Pentium or its equivalent. The processor 100 couples to a host bus 110 for communicating with system logic such as a cache memory 102, a Mobile peripheral component interconnect bus Cache controller (MPC) 108 and pair of Mobile Data Buffers (MDB) 104. The cache memory 102 is a conventional cache memory for the processor 100 and preferably is comprised of high speed synchronous burst static Random Access Memories (RAM). The MPC 108 provides an interface to the cache memory 102 which includes tag RAMs and other logic for creating various cache ways, size, and speed configurations of the cache memory 102.

The MPC 108 and the MDB 104 also couple to a main memory 106 and a peripheral component interconnect (PCI) bus 112. The reader is assumed to be familiar with the PCI bus or the PCI specification incorporated by reference in the background of this specification. The MPC 108 provides address and control to main memory 106, which is comprised of up to 256 MByte of conventional dynamic random access memories (DRAMs). The MDB 104 provides a 64-bit data path between the host bus 110 and the main memory 106 and provides a 32-bit data path to the PCI bus 112. The MPC 108 and MDB 104 are proprietary devices having three major functional interfaces: a processor/cache interface, a main memory interface, and a PCI bus interface. The MDB 104 is responsible for buffering data between the three interfaces while MPC 108 is responsible for handling addressing, command and control. Each of these interfaces operate independently from the other and include queues for read and write posting between any two of the three interfaces. The processor/cache interface allows the processor 100 to pipeline cycles into read cycles and allows snoop accesses to the tag RAM to occur while the pipeline cycles are executing. The memory interface controls the main memory 106 and generates control signals to the MDB 104. The interface also allows read ahead operations for those PCI masters issuing a read multiple command. The PCI interface allows MPC 108 to act as a PCI master when the processor 100 is accessing the PCI bus 112, or as a PCI slave when a PCI device accesses main memory 106.

The PCI bus 112 provides a communications conduit between the laptop computer L and the expansion base E. A portion 112a of the PCI bus 112 resides in the laptop computer L and includes a quickswitch 146 for each signal of the PCI bus 112. The quickswitches 146 are low loss series in-line MOSFET devices with the gate connected to a docking detection means for providing hot plug capabilities. When the laptop computer L is docked into the expansion base E, a portion 112b of the PCI bus 112 in the expansion base E is coupled to the portion 112a to provide an extended PCI bus 112.

In the laptop computer L, the PCI bus 112a further couples to a video graphics controller 114, a PC card interface 116 (particularly 116a) and a mobile integrated system controller (MISC) 118 (particularly 116b). In the expansion base E, the PCI bus 112b further couples to a second MISC 118 (particularly 118b), two PCI slots 148, and a second PC card interface 116 (particularly 116b). The video graphics controller 114 further couples to a low power liquid crystal display (LCD) 120 or alternatively a cathode ray tube (CRT) style monitor. The PC card interface 116 includes DMA capabilities and is provided for communicating with add-on cards 120, preferably of a personal computer memory card international association (PCMCIA) style, such as networking cards, modem cards, solid state storage cards and hard disk storage cards. Of particular interest are the DMA capabilities contained in the PC card interface 116 since, as will be discovered below, these features overcome the prior art limitations. It is noted that although the preferred embodiment includes the PC card interface, any input/output device requiring DMA is capable of residing on the PCI bus or VL-bus according to the present invention. The MISC 118 provides an industry standard architecture (ISA) bus 138 or 140, and an integrated drive electronics (IDE) hard drive interface for communicating with hard drives 122. The MISC 118 is configurable based on an input pin for use in both the laptop computer L, as MISC-L 118a, and expansion base E, as MISC-E 118b. Thus, two MISC devices, 118a and 118b are coupled to the PCI bus 112, with MISC-L 118a coupled to the PCI bus portion 112a and MISC-E 118b coupled to PCI bus portion 112b. MISC-L is further coupled to the internal ISA bus 138 while MISC-E is coupled to the external ISA bus 140. The reader is assumed to be familiar with the ISA bus.

As the general functionality of MISC-L 118a and MISC-E 118b are very similar, at this point they are discussed together for simplicity. The MISC 118 bridges the PCI bus 112 to the ISA bus 138/140 and acts as both a master and slave on the PCI bus 112 and a bus controller on the ISA buses 138 and 140. The MISC 118 further includes a PCI bus arbiter, an ISA bus arbiter, 8237 compatible direct memory access (DMA) controllers, an enhanced DMA controller for fast IDE hard drives, 8254 compatible timers, an 8259 compatible interrupt controller, hot docking support logic, system power management logic, and plug and play support (all not shown in FIG. 2). Of particular interest to the present invention are the DMA controllers of MISC 118 which are more fully described below. Some components will be disabled upon initialization by software to prevent conflicts or duplication. In MISC 118 there is also a serial interrupt interface 144 for serially passing interrupts from MISC-E 118b to MISC-L 118a which provides an interrupt architecture for supporting standard ISA interrupts in a PCI based system.

The MISC 118 and the ISA buses 138 and 140 provide support for standard ISA peripherals such as those combined in a mobile super input/output (MSIO) 124 peripheral. The MSIO 124 peripheral is a proprietary chip having a combination of standard ISA peripherals, such as: a 146818 compatible real time clock (RTC), a floppy controller for interfacing to standard floppy drives 130; an 8051 compatible microcontroller for communicating with a standard keyboard 132 and pointing device 150, for performing scanning and key code conversions on the keyboard 132, and for performing power management functions; a universal asynchronous receiver transmitter (UART) for providing standard serial ports 136; and parallel port logic for a parallel port 134. A read only memory (ROM) 126 couples to the MSIO 124 for providing code to the 8051 microcontroller. Additionally, the ROM 126 provides basic input/output services (BIOS) code to the processor 100 which is copied from the ROM 126 and shadowed in main memory 106 upon system initialization so that thereafter the 8051 microcontroller may access the ROM 126. A serial bus 152 is provided for communicating information relating to power management and hot docking.

In the laptop computer L, a modem and audio peripheral 128 is also provided and coupled to the ISA bus 138. The modem and audio peripheral 128 includes a standard telephony communications port for coupling to a telephone T, and an interface for coupling to a pair of stereo speakers S. In the expansion base E, three ISA expansion slots 142 are provided for standard ISA cards.

Figure 3:
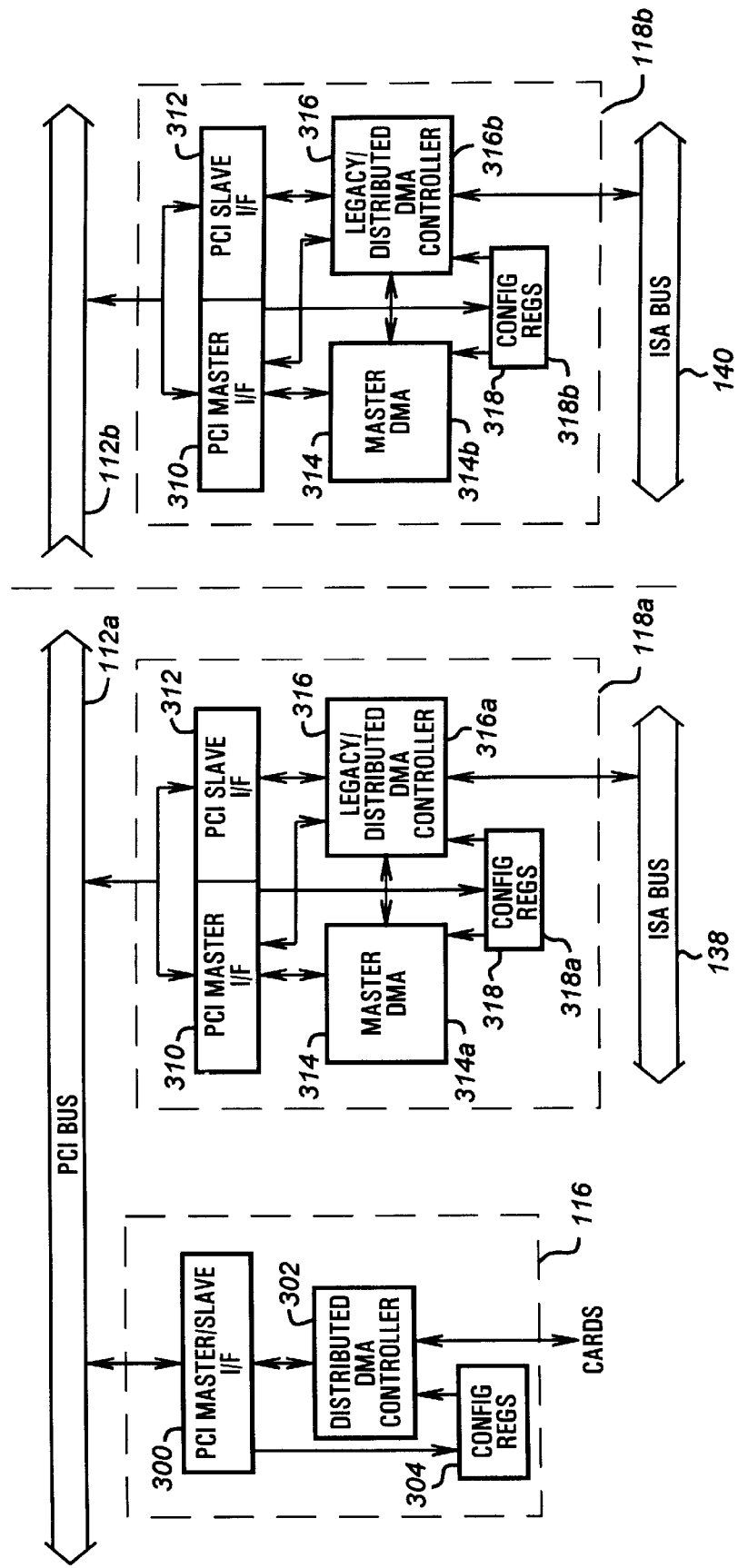
FIG. 3 is a more detailed block diagram illustrating the DMA master and the distributed DMA Slave controller of FIG. 2 according to the preferred embodiment.

Now turning to FIG. 3, there is illustrated a more detailed block diagram showing the PC card interface 116, MISC-L 118a and MISC-E 118b. The PC card interface 116 includes a distributed DMA controller (DDMA) 302 which couples to the PCI bus 112 through a PCI master/slave interface 300. DMA functionality is provided to cards 120 by the distributed DMA controller 302. Through the PCI master interface 300, the distributed DMA 302 can perform DMA transfers as a PCI bus master on the PCI bus. In addition to control registers, a plurality of configuration registers 304 are provided to configure the distributed DMA controller 302. Input/output cycles to the distributed DMA controller 302 are handled according to a special translation method described below. Data transfers between an input/output device, such as the PC card interface 116, and main memory 106 result in memory cycles over the PCI bus 112. The term distributed DMA controller is a general term used herein to indicate DMA controllers having the capabilities of the present invention. A distributed DMA controller may have one or more DMA channels.

As described above, the MISC-L 118a and MISC-E 118b provide identical features, however software may enable and disable certain features to avoid conflicts or duplication. Since the MISC-L 118a and MISC-E 118b are similar, they are described together with the differences duly noted. The MISC 118 resides on the PCI bus 112 and performs as both a PCI slave and PCI bus master. Accordingly, a PCI master interface 310 and PCI slave interface 312 are provided for these purposes.

The MISC 118 contains a DMA controller 316 which is configurable, according to configuration registers 318, to operate as either a conventional DMA controller or a distributed DMA controller. In the conventional DMA controller configuration, the DMA controller 316 provides DMA transfers over the ISA bus as described in FIG. 1A and 1B. Of interest to the present invention, however, is the distributed DMA configuration, and therefore from this point on, DMA controller 316 is assumed to be configured as a distributed DMA controller.

Both MISC-L 118a and MISC-E 118b have a DMA master 314 which is coupled to the distributed DMA 316. It is the function of the DMA master 314 to cause the distributed DMA controllers 302 and 316 to appear as the conventional DMA controllers 200 to maintain compatibility with existing DMA controller software. The DMA master 314 performs this function by claiming PCI cycles intended for the conventional DMA controllers 200. Since the DMA master 314 claims all conventional DMA controller cycles, only one of the DMA masters 314a and 314b is enabled, preferably 314a. Thus, the DMA master 314a supports all seven channels of the conventional DMA controller 200. Accordingly, the distributed DMA 316, particularly 316b, is coupled to the PCI slave interface for receiving cycles from the DMA master 314a. Because distributed DMA controller 316 is internal to MISC-L 118a, distributed DMA controller 316a communicates directly with DMA master 314a and no PCI cycles are driven. The distributed DMA controller 316 is also coupled to the PCI master interface 310 for performing DMA transfers over the PCI bus 112 as a bus master. It is noted that any PCI master may communicate with the registers of the distributed DMA controllers 302 and 316. As such, it is contemplated that the DMA master 314 could be located in any PCI mastering device, such as the MPC 108. If in the MPC 108, it is assumed that performance would be enhanced.

Figure 4B:
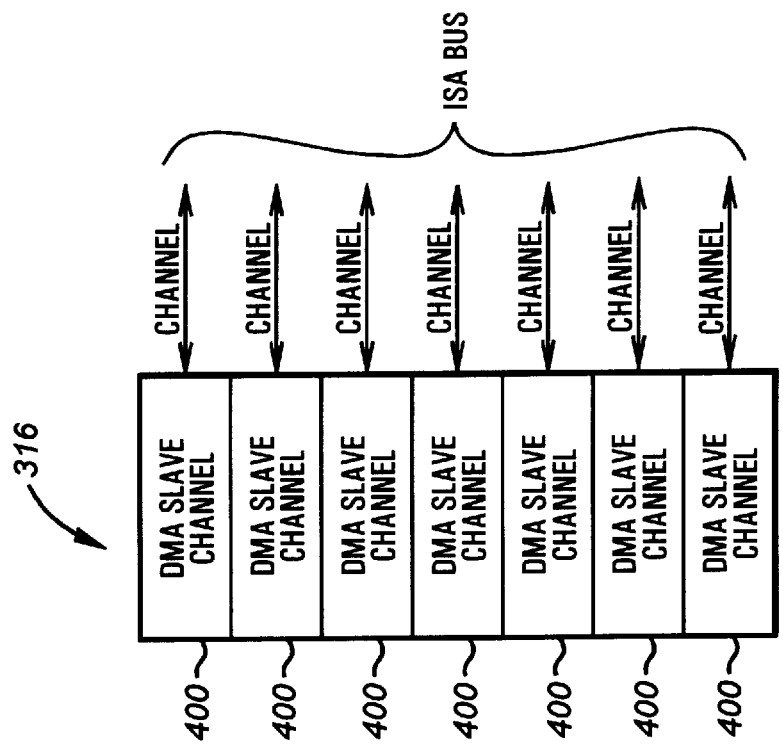
FIGS. 4A and 4B are block diagrams of the distributed DMA Slave controllers of the PC card I/F and MISC respectively.
Figure 4A:
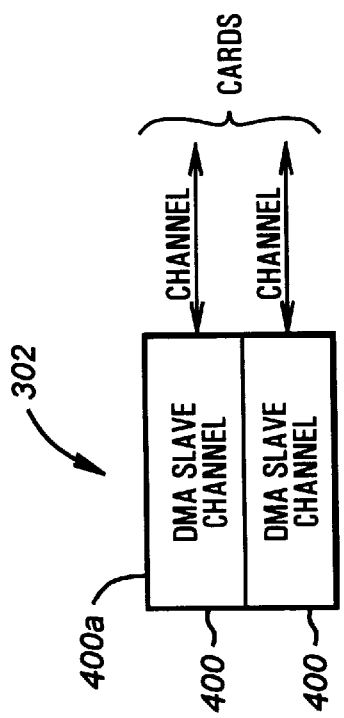

Now also referring to FIGS. 4A and 4B, it is revealed that the distributed DMA controller 302 is comprised of two DMA slave channels 400 and that the distributed DMA controller 316 is comprised of seven DMA slave channels 400. Each DMA slave channel 400 compatibly functions as one channel of the conventional DMA controllers 200. Each DMA slave channel is isolated and independent from the other so that individual DMA slave channels may be distributed among PCI devices. This has the effect of breaking the conventional DMA controllers 200 into separate channels, existing in different PCI devices. The present invention allows this separation, and yet to the operating system and application software, there is still the appearance of the cascaded conventional DMA controllers 200.

Figure 5:
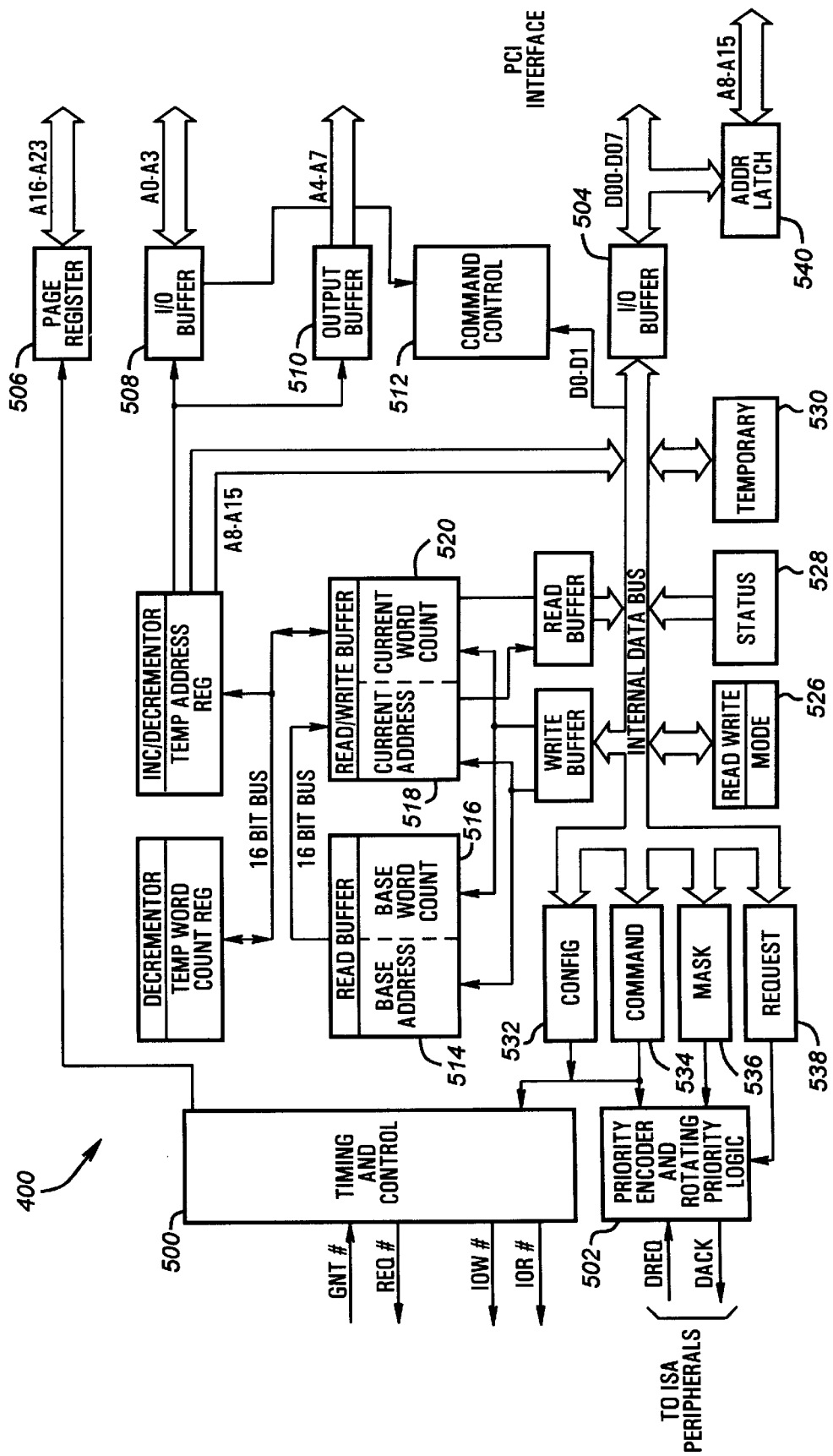
FIG. 5 is a detailed block diagram of a distributed DMA Slave controller according to the preferred embodiment.

Now referring to FIG. 5, there is a more detailed block diagram of a DMA slave channel 400. To be compatible with the conventional DMA controller 200, each DMA slave channel 400 supports certain registers of the conventional DMA controller 200, specifically, a command register 534, a status register 528, a mode register 526, a mask register 536 and a request register 538, a base address register 514, current address register 518, base word count register 516, current word count register 520, a page register 506 and a master clear register (not shown). These registers are also described in Table 1.

The DMA slave channel 400 interfaces to the PCI bus 112 through a timing and control logic block 500, a latch 540 and an I/O data buffer 504. The PCI interface is responsive as a PCI master or slave. When the DMA slave channel 400 is receiving commands from a PCI mastering agent, such as the processor via MPC 108 and MDB 104, the DMA slave channel is a PCI slave device. When the DMA slave channel 400 is performing DMA transfers, such as when a card 120 requests data from main memory 106, the DMA slave channel 400 is a PCI bus master device. Commands are received into the DMA slave channel 400 through the I/O data buffer 504 and decoded by a command control logic block 512. When a DMA operation is performed, the memory address is driven by the DMA slave channel 400 by the output buffer 510, the I/O buffer 508, the latch 502 and the page register 506. For word transfers, the DMA slave channel 400 is not connected to the least significant address bit, so I/O buffer 508, output buffer 510 and latch 540 drive the A1–A16 address lines of the PCI address bus, instead of the illustrated A0–A15 lines and the page register 506 low bit is used. The latch 540 receives the upper 8 bits of the 16-bit address provided by the DMA slave channel 400 from the I/O data buffer 504. The priority encoder and rotating priority logic block 502 handles access requests to the PCI bus 112, via conventional PCI request (REQ#) and PCI grant (GNT#) signals. It is noted that the conventional PCI signals described herein use a notation "#" to represent an active low signal.

It is contemplated that one implementation resulting from the distributed DMA architecture could be a floppy controller and floppy drive coupled to the PCI bus. The DMA slave channel 400 interfaces to ISA peripherals, such as the floppy controller of MSIO 124, through a priority encoder 502 and the timing and control 500. DMA request signals (DREQ) are received into and DMA acknowledge signals (DACK) are provided from the priority encoder and rotating priority logic block 502 for resolving priority contention if more than one channel is requesting service simultaneously of the distributed DMA controller 302 or 316. An input/output write signal (IOW#) and input/output read signal (IOR#) are provided by the timing and control logic 500 to control DMA read and write operations with the peripheral. Other variations of interfacing to the peripherals are contemplated and are not inconsistent with the present invention, especially since it is expected that the DMA slave channel will become an integral part of any PCI device requiring DMA. In such cases, the interface to the peripheral may be entirely proprietary.

Each DMA slave channel 400 includes the above described registers in a set of 16, 8-bit registers, as defined in Table 1, to provide certain compatibility with the conventional DMA controller 200. This set is locatable anywhere in the input/output space of the laptop computer L, via configuration registers. Each DMA slave channel 400 has a DMA slave configuration register, as defined in Table 2, which defines a unique base address for the block of registers. At this point it is useful to note that although greater than seven DMA slave channels are present in the system, only seven are allowed to be enabled at any one time to remain compatible with the conventional DMA controllers 200.

The DMA slave configuration register described in Table 2 contains a bit for enabling a non-conventional extended addressing mode. If enabled, the DMA slave channel 400 increases both the address registers 514 and 518; and word count registers 516 and 520 by a byte, effectively bringing the address up to 32 bits and count up to 24 bits. The extended address register is located at base address +3 and extended count register at base address +6, as illustrated in Table 1.

TABLE 1

DMA SLAVE CHANNEL REGISTERS

| Slave Address | R/W | Register Name |
| --- | --- | --- |
| base + 0h | W | Base Address 0–7 |
| base + 0h | R | Current Address 0–7 |
| base + 1h | W | Base Address 8–15 |
| base + 1h | R | Current Address 8–15 |
| base + 2h | W | Base Address 16–23 |
| base + 2h | R | Current Address 16–23 |
| base + 3h | W | *Base Address 24–31 |
| base + 3h | R | *Current Address 24–31 |
| base + 4h | W | Base Word Count 0–7 |
| base + 4h | R | Current Word Count 0–7 |
| base + 5h | W | Base Word Count 8–15 |
| base + 5h | R | Current Word Count 8–15 |
| base + 6h | W | *Base Word Count 16–23 |
| base + 6h | R | *Current Word Count 16–23 |
| base + 7h | N/A | Reserved |
| base + 8h | R | Status |
| base + 8h | W | Command |
| base + 9h | R | Reserved |
| base + 9h | W | Request |
| base + Ah | N/A | Reserved |
| base + Bh | R | Reserved |
| base + Bh | W | Mode |
| base + Ch | N/A | Reserved |
| base + Dh | R | Reserved |
| base + Dh | W | Master Clear |
| base + Eh | N/A | Reserved |
| base + Fh | R/W | Mask |

(*optional)

TABLE 2

DMA SLAVE CONFIGURATION REGISTERS

| Bits | Bit Description |
| --- | --- |
| 0 | Channel Enable<br>0 disabled<br>1 enabled |
| 1–2 | Transfer Size<br>00 = 8 bit transfer<br>01 = 16 bit transfer<br>10 = 32 bit transfer, non Conventional<br>11 = reserved |
| 3 | Non Conventional Extended Address<br>0 = disabled<br>1 = enabled |
| 4–15 | Slave Base Address |

As described above, the DMA master 314a is responsible for converting operations intended for the conventional DMA controllers into cycles for the DMA slave channels 400, thereby preserving compatibility with existing software. The DMA master 314a has a DMA master configuration register (configuration registers 318a) which includes a bit for enabling the DMA master, as shown in Table 3. The default condition is disabled, whereby the conventional/distributed DMA controllers 316 would be used in the conventional configuration and conventional/distributed DMA controller 316b would be rendered unusable. The DMA master 314a also contains a DMA master/slave configuration register so that the DMA master may identify where each DMA slave channel 400 is located, as shown in Table 4. If the base address for the DMA master/slave configuration register is set to match the base address for the DMA slave configuration registers, the DMA master is able to communicate with the DMA slave channels 400. Two variations of the DMA master/slave configuration register are contemplated. In the preferred embodiment, the DMA master/slave configuration register has a single base address for grouping the seven DMA channels into a single 128 byte block (channel 4 not used). Alternatively, the DMA master could have a different base address for each DMA slave channel, thereby providing a mechanism for discontinuously mapping the DMA slave channels 400 in the I/O space of the computer L.

TABLE 3

DMA MASTER CONFIGURATION REGISTER

| Bits | Bit Description |
|---|---|
| 31 | DMA Master Enabled<br>0 disabled<br>1 enabled |
| 30–8 | RESERVED always reads 0's |
| 7–5 | Identifies active DMA channel in MISC PCI device. One bit per channel<br>0 Distributed Conventional DMA Channel<br>1 Local Conventional DMA Channel |
| 4 | RESERVED always reads 0 |
| 3–0 | Identifies active DMA channel in MISC PCI device. One bit per channel.<br>0 Distributed Conventional DMA Channel<br>1 Local Conventional DMA Channel |

TABLE 4

DMA MASTER/SLAVE CONFIGURATION REGISTER

| Bits | R/W | Bit Description |
|---|---|---|
| 31–16 | R | RESERVED always returns 0's |
| 15–7 | W/R | Slave Base Address where the 16 byte block of programming register for this channel exist |
| 6–4 | W/R | 000 DMA Channel 0 Slave Lower Address (6–4)<br>    Defines the start of the 16 byte block of I/O addresses for Channel 0<br>001 DMA Channel 1 Slave Lower Address (6–4)<br>    Defines the start of the 16 byte block of I/O addresses for Channel 1<br>010 DMA Channel 2 Slave Lower Address (6–4)<br>    Defines the start of the 16 byte block of I/O addresses for Channel 2<br>011 DMA Channel 3 Slave Lower Address (6–4)<br>    Defines the start of the 16 byte block of I/O addresses for Channel 3<br>101 DMA Channel 5 Slave Lower Address (6–4)<br>    Defines the start of the 16 byte block of I/O addresses for Channel 5<br>110 DMA Channel 6 Slave Lower Address (6–4)<br>    Defines the start of the 16 byte block of I/O addresses for Channel 6<br>111 DMA Channel 7 Slave Lower Address (6–4)<br>    Defines the start of the 16 byte block of I/O addresses for Channel 7 |
| 3 | W/R | Non Conventional Extended Addressing<br>RESERVED always returns 0; 0 = enabled<br>1 = enabled |
| 2–1 | W/R | Transfer Size<br>00 = 8 bit transfer<br>01 = 16 bit transfer<br>10 = RESERVED<br>11 = RESERVED |
| 0 | W/R | Channel slave interface active bit. When set to a 1, the distributed DMA Slave will accept PCI cycles to the programmed address in bits 4–15 (Dual port register with the DMA Master Configuration Register) |

Greater than seven DMA channels may be implemented in a distributed DMA architecture. However, to remain compatible with conventional software only seven DMA channels may be enabled at any one time. It is noted that although eight DMA channels are provided, channel 4 is a cascaded channel and therefore is not usable. It is therefore customary to refer to the DMA controller 200 as having only seven channels. The distributed DMA architecture provides several methods through which special operating system software may access and control more than seven DMA channels.

Figure 11:
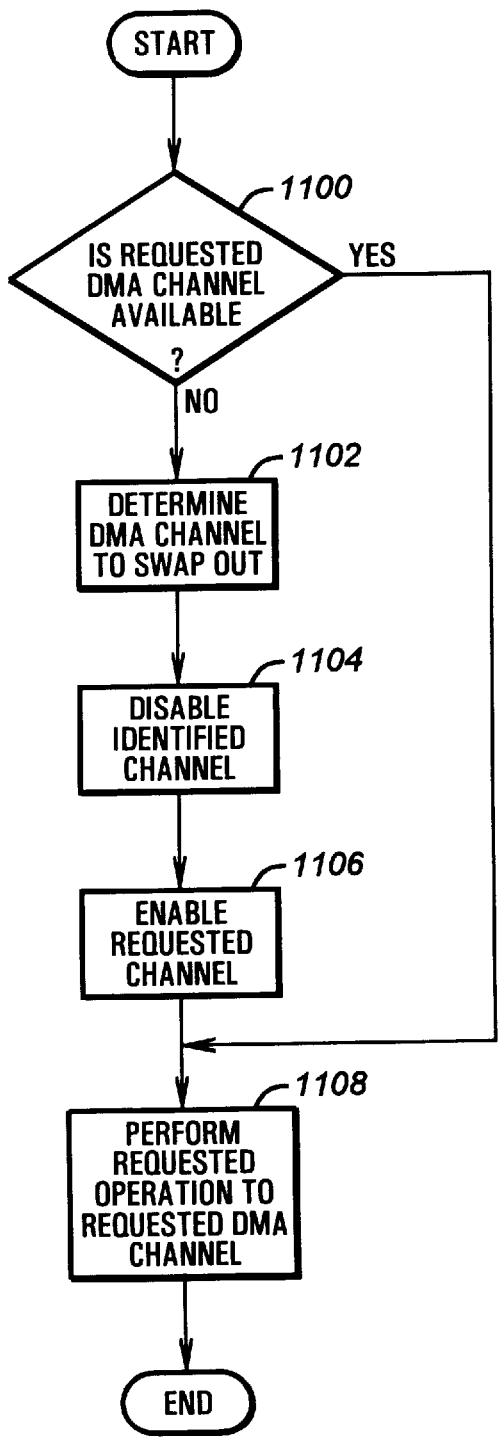
FIG. 11 is a flow diagram illustrating a paging technique for utilizing greater than seven DMA channels in a computer system according to the preferred embodiment.

Referring to FIG. 11, there is illustrated a flow diagram of operating system software. Not shown in this flow chart is the earlier read/write operation as requested by applications software. For purposes of this illustration, assume there are nine DMA channels available called channels A–I. Also assume that seven channels, channels A–H, are configured as DMA slave channels 0–7, and therefore, channel I is unavailable for input/output operations. Assumed now that a read/write operation to channel I has been requested, such as by a floppy drive or other peripheral, and at the start of this sequence the operating system has received but not yet serviced the request. At step 1100, the operating system, or DMA device driver, determines if the requested DMA channel is available. Since in this example channel I is requested and unavailable, the operating system proceeds to step 1102. At step 1102, the operating system determines which of DMA channels A–H to swap out. This determination can be based upon channel inactivity or logical channel assignments so that channel conflicts are avoided. For example, if channel A was inactive for a long period of time or if because channels A and I were both being used as logical channel 0. At steps 1104 and 1106 the identified channel is disabled and the requested channel is enabled. The disabling of the identified channel can be performed in a number of ways. One method is to disable channel A by clearing bit 0 in the DMA slave configuration register corresponding to channel A. Then, if the DMA slave configuration register of channel I contained an identical slave base address and channel I was enabled, channel I would respond in place of channel A.

An alternate method involves changing the base address of the DMA slave configuration registers. According to the DMA master/slave configuration register, the master DMA assumes that channel 0 is at a certain address. By writing the channel A base address into the channel I base address field of channel I's DMA slave configuration register and changing the base address of channel A to an address not recognized by the DMA master, channel I will respond in place of channel A.

A third alternate method involves assigning a different base address to channels A and I and changing the base addresses in the DMA master/slave configuration register. If channel A is to be accessed as channel 0, the base address of channel A is written into the DMA master/slave configuration register. If channel I is to be accessed as channel 0, the base address of channel I is written into the DMA master/slave configuration register. This method works best when the DMA master uses independent 16 byte blocks to store the base addresses for the channels. A fourth variation is used when the base addresses are referenced by the DMA master in a single 128 byte block. In this case, the DMA master has a single slave base address field in which all seven channels are referenced. This field can be changed so that effectively an alternative set of DMA channels can be accessed. Thus a new set of DMA channels are paged in. The newly paged DMA channels may be comprised of an entirely new set of seven channels, or only one or two new channels.

Once the channels have been properly swapped, at step 1108, the operating system, in conjunction with the basic input/output services (BIOS) of the computer system, is free to perform the requested operation. If at step 1100 it was determined that the request channel was available, the operating system proceeds to step 1108 to perform the requested operation. It is noted that even though a particular DMA slave channel may be unavailable to the operating system for input/output operations, DMA operations may continue. For example, if channel A has been configured for DMA transfers and thereafter the operating system swaps out channel A for channel I, a DREQ to channel A will result in a DMA transfer.

Now turning to FIG. 6A and with reference to FIGS. 2–4, a typical I/O read/write operation to the distributed DMA controllers 302 and 316 will be described according to the preferred embodiment. The reader is referred to the PCI Specification for further information on specific PCI signals. At step 600 the processor 100 initiates an I/O read/write cycle using compatible I/O addresses of the conventional DMA controllers 200. The I/O addresses for the conventional DMA controllers 200 are well known in the art, but are also reproduced below in Table 5.

TABLE 5

CONVENTIONAL DMA I/O ADDRESS

| I/O ADDRESS RANGE | FUNCTION |
|---|---|
| 000–01F | DMA Controller 202 (byte transfers) |
| 080–08F | DMA Page Registers |
| 0C0–0DF | DMA Controller 204 (word transfers) |
| 480–48F | Extended Page Registers |

At step 602, the DMA master 314a, recognizing that the operation is a conventional DMA cycle, claims the cycle. Cycles are conventionally claimed on the PCI bus 112 by driving a device select signal (DEVSEL#, not shown). As 314a is enabled and 314b is disabled, only 314a responds. At step 604, after the DMA master 314a has received the command from the requesting PCI agent (IRDY# asserted), the DMA master 314a issues a retry to the processor 100 to force the processor 100, or actually the PCI/cache/memory controller 108, off the PCI bus 112. Cycles are conventionally retried with a STOP# signal, and particular timing depends upon whether or not data is accepted. In the preferred embodiment, data will be accepted, unless an error condition is present. At approximately the same time the DMA master 314a requests the PCI bus 112. At step 606, the DMA master 314a waits for the PCI bus 112 to be granted. When access of PCI bus 112 is granted to the DMA master 314a, the DMA master 314a determines which of the DMA slave channels 400 are targeted and thereafter reads/writes to the individual DMA slave channels registers, as shown in step 608 over the PCI bus. The DMA master 314a will perform up to four read/writes to the DMA slave channels 400, corresponding to the primary or secondary DMA channels. If the DMA master 314a is reading from individual DMA slave channels 400, such as the status register 528, the data is merged into a single byte to provide a compatible response to the processor. If the DMA master 314a is writing to individual DMA slave channels 400, the number of write cycles is dependent upon which channels are effected by the write cycle. For example, a new command register value for the secondary DMA controller 202 will be written to all the DMA slave channels 400 corresponding to the byte-wide channels 3–0, whereas a new mask register value will only be written to one of the DMA slave channels. Further details on the construction and decoding of conventional DMA controller registers is contained below in the DMA control register descriptions.

Therefore, the DMA master 314a is controlled by the processor 100, and the DMA slave channels 400 are slaved to the DMA master 314a. It is the responsibility of each DMA slave channel 400 to respond and terminate a PCI I/O read/write to its registers. Hence, each register of each individual DMA slave channel 400 is addressable according to the address maps of Tables 6–14. The bit descriptions and positions for each register are compatible with the conventional DMA controller 200 unless otherwise noted.

Once each affected DMA slave channel 400 has returned the requested information or the DMA master 314a has written the information to the affected DMA slave channel (s) 400, at step 610 the DMA master 314a sets an internal completion flag to indicate completion. The DMA master 314a then relinquishes control of the PCI bus 112, by deasserting the request signal (REQ#), as shown at step 612. At step 614 the DMA master 314a waits for the processor 100 to retry the conventional DMA I/O read/write cycle. At step 616, when the processor 100 retries the transaction, the DMA master 314a now having completed its communications with the individual DMA slave channels 400, thereby responds to this second request. If the request was a read directed to the conventional DMA controller 200, then the data is provided. If the request was a write operation directed to a conventional DMA controller 200, then a completion indication is provided, the write data having actually been sampled on the first attempt. When responding, the DMA master 314a resets the completion flag. Thereby, compatibility to the conventional DMA controllers 200 is achieved through the master/slave method disclosed above. It is contemplated that this method is useful for other applications requiring compatibility or isolation.

The DMA master 314a supports the programming model of the conventional DMA controller 200 through a plurality of control registers, described below in Tables 6–14. Since there are both byte-wide and word-wide DMA controllers in the laptop computer L, there are two registers for each register defined. Also, since the DMA master 314a translates conventional cycles to DMA slave cycles, two sets of input/output addresses are defined.

Figure 6A:
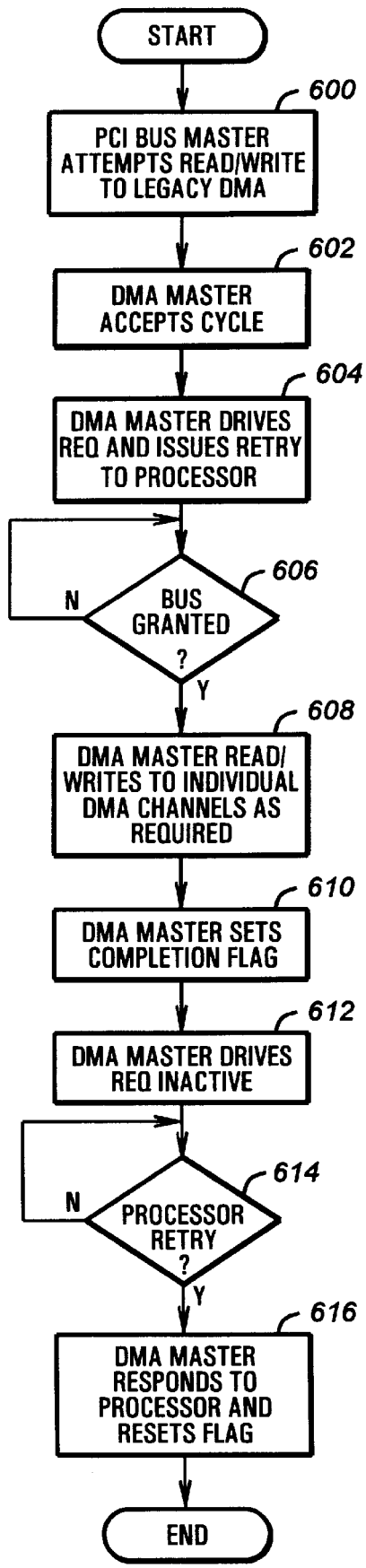
FIGS. 6A and 6B are a flow diagrams illustrating a PCI bus master read/write operation to a conventional DMA controller address as performed by the distributed DMA architecture of the present invention.
Figure 6B:
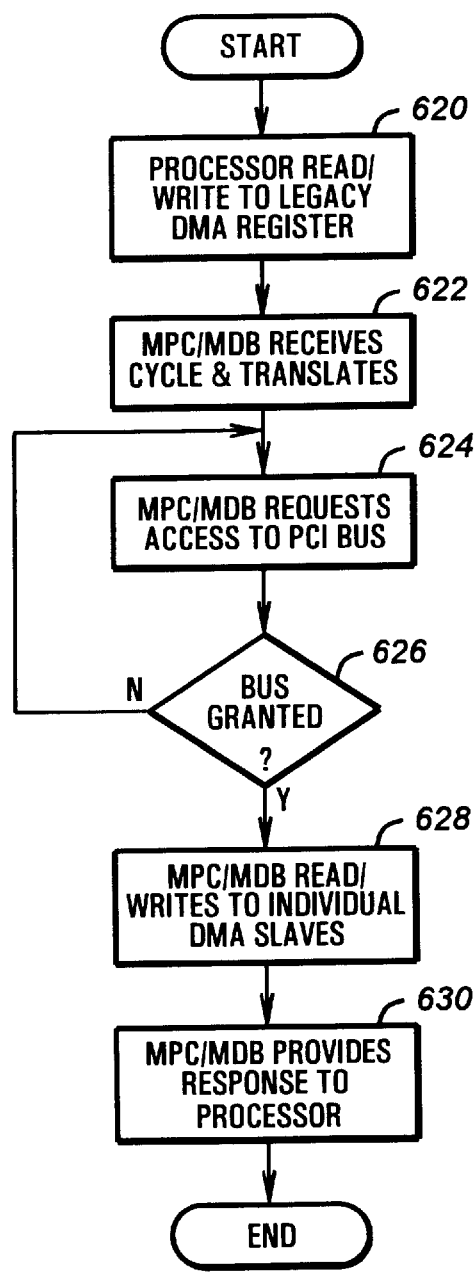

Now referring to FIG. 6B, there is illustrated an alternative method of accessing the DMA slaves 302 and 316. FIG. 6B corresponds to an alternative embodiment, mentioned above, in which the DMA master 314 would be contained in MPC 108 and MDB 104 (MPC/MDB). In such a configuration, the processor 100 would provide the access cycle to the MPC/MDB using the conventional addresses, as shown at step 620. The MPC/MDB receives the cycle and before passing the cycle to the PCI bus 112, the MPC/MDC translates the cycle into at least one bus transaction directed to at least one of the individual DMA slave channel 400 registers at its corresponding address. The MPC/MDB requests access to the PCI according to PCI conventions, as shown at steps 624 and 626. After control has been granted, at step 628, the MPC/MDB accesses the request register. The number of bus transactions is dependant upon whether the cycle is a read or a write, and which register is being accessed. Details on the suggested number of cycles are contained below in Tables 6–14. Each DMA slave channel 400 being accessed provides a response to MPC/MDB. The response is similar to that described steps 608 and 610 of FIG. 6A. At step 630 the MPC/MDB provides the received responses to the processor 100. Thus, in this alternative method, the retry operation is not needed since the DMA master is placed between the processor 100 and the DMA slave channels 400. It is useful to note, however, that if another PCI master requests access to the DMA channel slaves 400 by using a conventional address, a retry operation, such as described in FIG. 6A would be necessary.

Figure 7A:
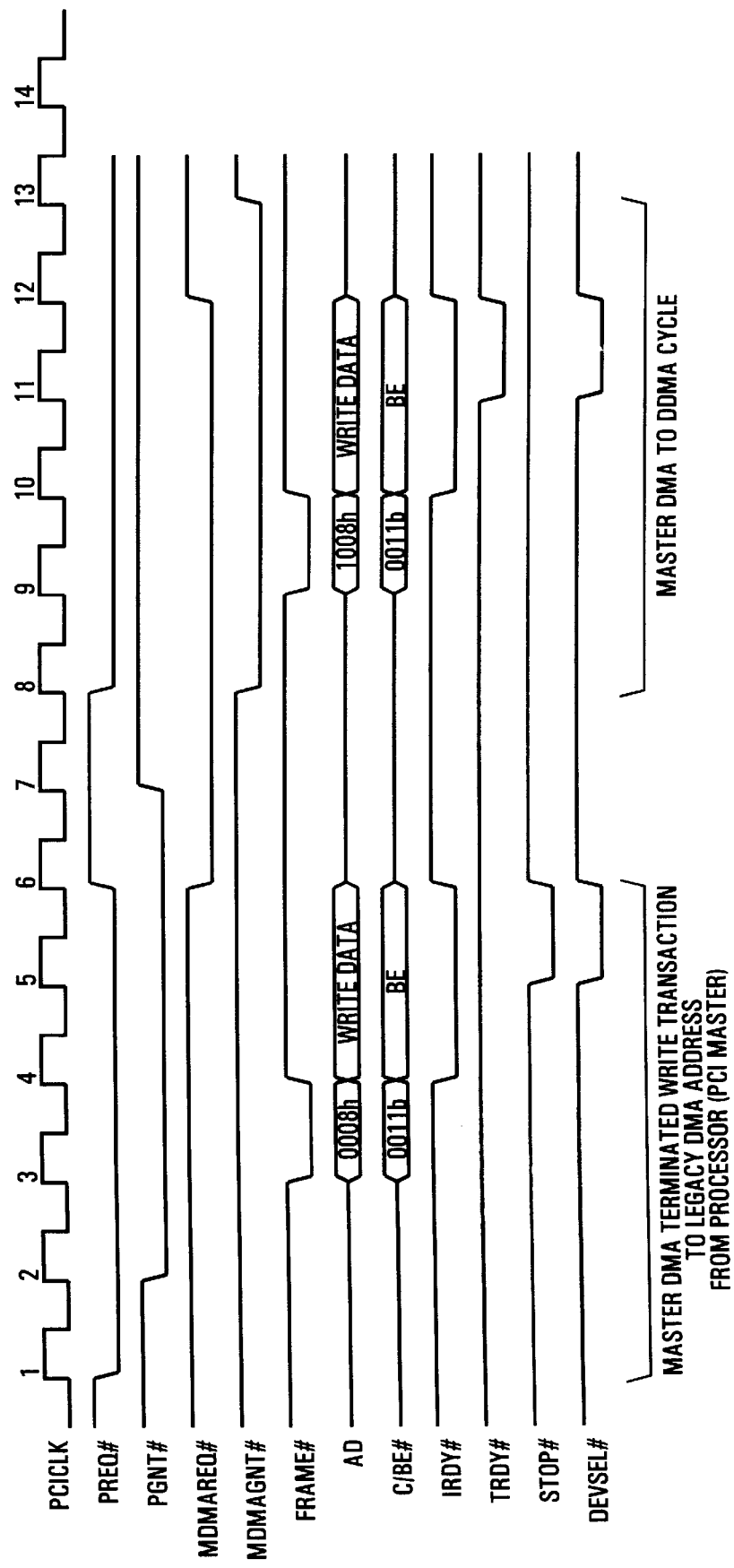
FIGS. 7A and 7B are timing diagrams illustrating a PCI bus master write operation to a conventional DMA controller address as performed by the distributed DMA architecture of the present invention.
Figure 7B:
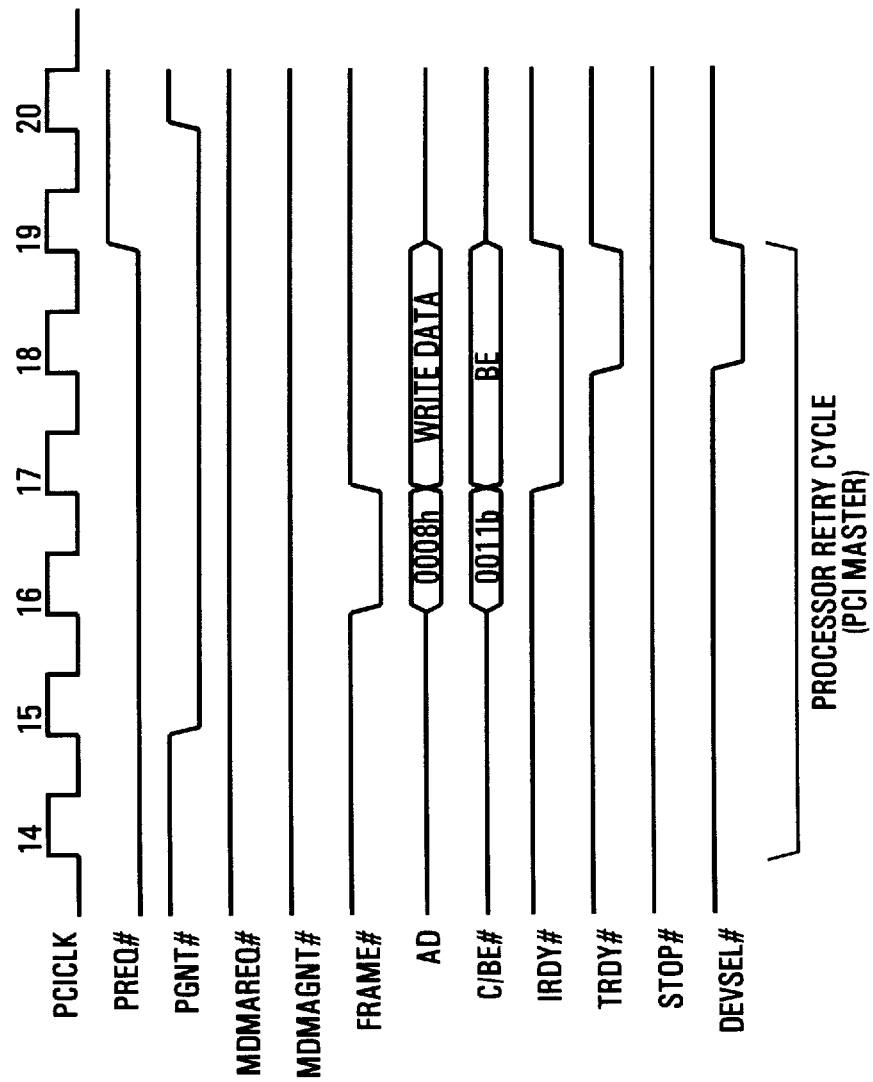

Now referring to FIGS. 7A and 7B, a write transaction directed to the command register of the byte-wide DMA controller 202 is illustrated. Recalling that the command register is a shared register and that the byte-wide DMA controller functionality may be distributed among up to four DMA slave channels 400, the single write transaction directed to the conventional DMA controller 202 address may result in up to four write transactions to the DMA slave channels 400. In the example of FIGS. 7A and 7B, it is assumed that channel 0 has been assigned to the distributed DMA controller 302 with one of the two DMA slave channels 400 being having the assignment. DMA channels 1–3 are assumed disabled for simplicity.

In the following description, it is noted that although reference is to the processor providing the PCI signal, the MPC 108 and MDB 104 acting as PCI bus masters actually drive the PCI signal, but reference is made to the processor simply because it is the source. Furthermore, any PCI bus master may direct read/write cycles to the conventional DMA controllers 200 with similar results. One skilled in the art would also appreciate that although the preferred embodiment provides the DMA master 314*a* in the MISC 118, an alternative is to place the DMA master closer to the processor 100, such as in the MPC 108/MDB 104.

At clock 1 of FIG. 7A, the processor 100 causes a processor PCI bus access request (PREQ#) signal to be asserted, intending to write a value into the command register of the byte-wide conventional DMA controller 202. At clock 2 the arbiter of the MISC-L 118 provides a grant (PGNT#) signal to the processor 100 to indicate that the processor has been granted access to the PCI bus 112. According to the PCI bus specification, a frame (FRAME#) signal is asserted to indicated the beginning of a transaction, as shown at clock 3. At the same time the processor 100 causes an address to be placed on an address/data portion of the PCI bus 112 and a PCI command to be placed on a command/byte enable portion of the PCI bus 112. The address 0008h indicates the input/output address of the conventional DMA controller 202 command register. The PCI command indicates that the operation is a I/O write operation. At clock 4 the FRAME# signal is deasserted since only one data phase is needed. Also at clock 4 the initiator ready (IRDY#) is asserted by the processor 100 to indicate that data is available to be written.

According to the preferred embodiment, only DMA master 314*a* responds to conventional DMA addresses when configured in distributed DMA configuration. However, since the registers of the DMA slave channels 400 are distributed among several devices, the DMA master may need to communicate with the DDMA controllers before the transaction can be successfully completed. This is especially true where the processor is requesting a certain channel register to be read. Therefore, at clock 5 the DMA master 314*a* asserts a device select (DEVSEL#) signal to claim the transaction and asserts a stop (STOP#) signal to terminate the transaction and cause it to be retried. Although the transaction is terminated, if the transaction is a write transaction, the DMA master 314*a* latches the data at clock 6.

At clock 6, since IRDY# and STOP# are asserted, the processor must cause the PREQ# signal to be deasserted for at least two clock cycles so that another device may have access to the PCI bus 112. At clock 7 the PGNT# is deasserted following the deasserted PREQ# signal.

At clock 6 the DMA master 314*a* requests access to the PCI bus 112 by asserting its request (MDMAREQ#) signal. Sometime later, the arbiter of MISC-L 118*a* will provide a grant (MDMAGNT#) signal to the DMA master 314*a*, as shown in clock 8.

At clock 9 the DMA master 314*a* begins to process the requested write transaction. The DMA master 314*a* provides an address, for example 1008h, and PCI bus command and causes the FRAME# signal to be asserted. In this operation from the DMA master 314*a* to the DMA slave channel 400, the I/O address is 1008h to indicate the command register associated with channel 0. Since DMA slave channel 400*a* of distributed DMA controller 302 has been configured for channel 0, it is the only distributed DMA controller that will respond to this address. The distributed DMA controllers 302 and 316 only respond to the addresses associated with channels they have been configured for. While a particular DMA slave channel knows its addresses, it is not necessary for it to know which channel number it is.

At clock 10 the DMA master 314*a* provides the write data received from the processor 100 to the DMA slave channel 400*a*. The byte enable (C/BE#) signals indicate that only one byte is present. The initiator ready (IRDY#) signal is provided by the DMA master 314*a* to indicate that the data is available. At clock 11 the DMA slave channel 400*a* claims the transaction by asserting the device select (DEVSEL#) signal and accepts the data by asserting the target ready (TRDY#) signal. The write data is latched into the DMA slave channel command register at clock 12 and the transaction is completed. It is noted that if channels 0, 1 or 3 were enabled and configured in a second distributed DMA controller, such as distributed DMA controller 316*b*, three more write cycles would be performed for writing the command register to those DMA slave channels at their corresponding addresses. After the DMA master 314*a* has communicated with all of the DMA slave channels 400, the MDMAREQ# signal is deasserted, as shown at clock 12. The deassertion of the MDMAGNT# signal follows at clock 13.

At clock 15 the processor 100 reacquires the PCI bus 112 when the PGNT# signal is asserted. The cycle of clocks 2–4 are retried, as shown in clocks 15-17. However, this time since the DMA master 314*a* has completed the write transaction to the relevant DMA slave channels 400, the completion flag will be set. This causes the DMA master 314*a* to claim the cycle, by asserting the DEVSEL# signal, and complete the cycle, by asserting the TRDY# signal. If the cycle is a read, data will be provided to the processor 100. If the cycle is a write, the cycle will terminate successfully indicating to the processor that the write cycle was performed. At clock 19, the assertion of IRDY# and TRDY# indicate the cycle is completed and the PREQ# signal is accordingly deasserted. The PGNT# signal follows at clock 20. Thus, the processor performs cycles directed to the conventional DMA controllers 200, according to conventional operating system software, and the DMA master 314*a* hides the distributed DMA architecture, thereby appearing to software as the conventional DMA controllers 200.

Now referring to FIG. 8, a typical DMA data transfer according to the preferred embodiment is illustrated. This example illustrates the timing between the DMA slave channel 400, the PCI bus 112, the target PCI device (main memory 106) and the DMA peripheral. In this example the DMA peripheral is assumed to be a card 120, such as a network card requiring DMA transfers. For this illustration, the data transfer is from the network card 120, in conjunction with distributed DMA controller 302, to the main memory 106, such as when the computer has requested data from the network.

It is understood that prior to the initiation of this operation the laptop computer L has requested the network card 120 to obtain certain data from the network (not shown). The laptop computer L instructs the network card 120 to provide the data via a DMA operation. The computer also initializes the DMA controllers to prepare for the transfer. When the computer performs the DMA initialization operation, the DMA master 314a receives the command and initializes DMA slave channel 400, according to the methods described above.

FIG. 8 illustrates a number of signals referenced to a PCI clock (PCICLK) signal. It is noted that the PCICLK is provided for illustration purposes only. Signals specific to the PCI bus are properly referenced to the PCICLK signal, but other signals, such as the DMA signals may be dependent on a different clock signal. Further, it is noted that design choices may vary the response time of certain signals, but the sequence of signals is generally as shown.

When the network card 120 is ready to transfer data to the main memory 106, a DMA request (DREQ) signal is asserted, as shown at clock 1. The DREQ signal 5 is received by the DMA slave channel 400a and in response the DMA slave channel requests access to the PCI bus 112 by asserting a PCI bus request (REQ#) signal, as shown at clock 2. As many other PCI devices may access the PCI bus 112, the PCI bus arbiter of MISC 118a provides a bus grant (GNT#) signal to the DMA slave channel 400a at a time when the bus is available, as shown at clock 3. The DMA slave channel 400a then provides a DMA acknowledge (DACK#) signal to the network card 120 to indicate bus availability.

At approximately the same time, the DMA slave channel 400a drives a memory address and PCI bus command onto the PCI bus 112. The memory address indicates where the transferred data is to be written into the main memory 106. The PCI bus command indicates that a memory write operation is occurring on the PCI bus. The DMA slave channel 400a drives a frame (FRAME#) signal to indicate the validity of these values and to initiate the PCI bus operation, as shown at clock 5.

Since in this example a single data byte is to be transferred, the DREQ signal is deasserted shortly after the DACK signal is asserted. If more than one byte was to be transferred, the DREQ signal would remain asserted until during the last byte transfer. It is noted that a DMA operation may also be terminated when a terminal count is reached. More details are found in the Intel datasheets incorporated by reference. When the DREQ signal is deasserted, the REQ# and GNT# signals are also deasserted according to PCI bus specification convention.

When the DMA slave channel 400a provides the memory address on an address/data portion of the PCI bus 112, the main memory 106 decodes the address and claims the operation by asserting a device select (DEVSEL#) signal, as shown at clock 6. If the main memory 106 is ready to receive the data, the main memory 106 provides a target ready (TRDY#) signal to indicate readiness, as shown at clock 6. According to the PCI bus specification, both the TRDY# signal and an initiator ready (IRDY#) signal must be asserted before the transaction is ended. In this example, IRDY# is not asserted yet.

Since the address and bus command are driven from the DMA slave channel 400a and the data is provided directly from the network card 120, bus contention should be avoided. Therefore, the DMA slave channel 400a does not provide an input/output read (IOR#) signal until the DMA slave channel 400a has tri-stated the bus, as shown at clock 6. At approximately the same time, the IOR# signal is provided to the network card 120 to indicate that data may be provided onto an address/data portion of the PCI bus. At a clock 7, data is provided from the network card 120. Also at clock 7, the DMA slave channel 400a provides the byte enable (C/BE#) signals to the PCI bus 112 to indicate that a single byte is provided on a lower eight bits of the PCI address/data bus. The DMA slave channel 400a, knowing the data valid timing of the network card 120, drives the IRDY# signal at clock 7 to indicate data availability to the main memory 106. At clock 8, the DACK, IRDY#, TRDY#, DEVSEL# and IOR# signals are deasserted as the transfer is complete.

Thus, by distributing the functionality of the conventional DMA controllers among the peripherals that need DMA, the peripherals can be directly coupled to the PCI without sideband signals and without requiring an ISA bus.

Figure 9:
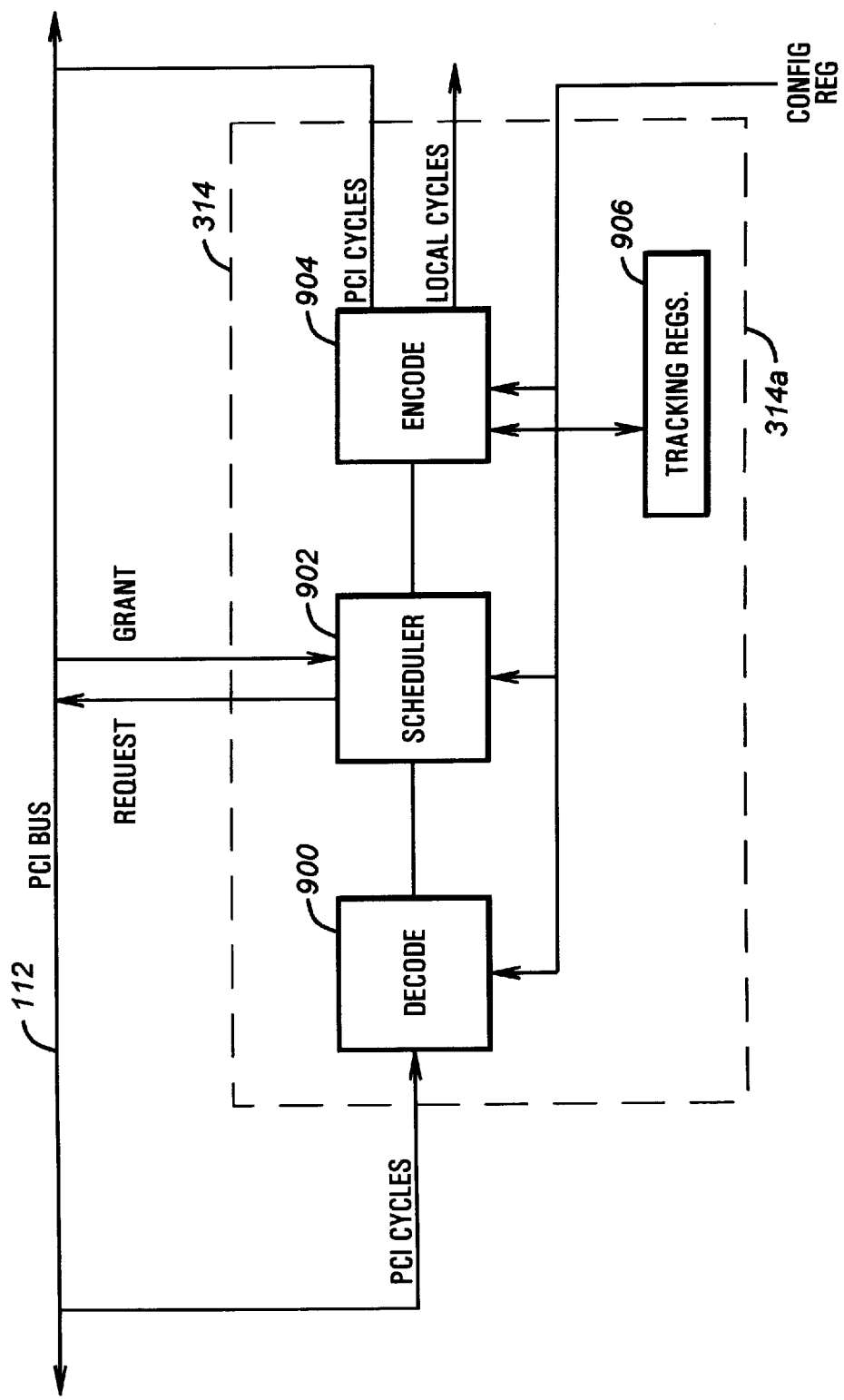
FIG. 9 is a block diagram illustrating more detail of the DMA master of FIG. 3 according to the preferred embodiment.

Now referring to FIG. 9, there is illustrated a more detailed block diagram of the DMA master 314. A decoder 900 receives PCI cycles from the PCI slave I/F 312. If distributed DMA is enabled in the DMA master configuration register and cycles are decoded as intended for the conventional DMA controllers 200, the DMA master 314a claims the cycle and forces a retry. A scheduler 902 then determines which DMA slave channels 400 are to receive the cycle according to Tables 16 and 17. Although only the number of spawned cycles for DMA channels 0–3 are listed in Tables 16 and 17, DMA channels 5–7 are similar except the maximum number of spawned cycles is three instead of four. The DMA master 314a then requests the PCI bus 112. When granted, the DMA master 314a encodes the received conventional cycle into the scheduled number of cycles for the individual DMA slave channels 400. In the preferred embodiment, certain DMA slave channels 400 may be internal to MISC 118 and hence, the encoded cycles are local or internal to the MISC 118 device and not driven onto the PCI bus 112.

There is an exception for spawning cycles to channels 0–3. According to the conventional configuration of FIG. 1B, channel 4 is not a useable channel because it is configured as a cascade channel. However, channel 4 registers are still accessible, and some, such as the masking registers and the command register, can be modified without reconfiguring the channel's cascade mode. Hence, if channel 4 is masked or disabled, then channels 0–3 are masked or disabled also.

In the distributed DMA architecture of the present invention, this compatibility is maintained. A conventional write to the primary DMA controller 204 command register to disable channels 4–7, also disables channels 0–3. A conventional write to the primary DMA controller 204 command register to enable channels 4–7, also enables channels 0–3 if they were disabled only due to a previous write to disable channels 4–7. A conventional write to the primary DMA controller 204 single channel or multichannel mask registers to mask channel 4 also masks channels 0–3. A conventional write to the primary DMA controller 204 master clear register enables the word-wide DMA controller 204 and sets the mask bits of channels 4–7, thereby disabling channels 4–7 and channels 0–3.

In the preferred embodiment, the DMA master 314a provides the support for the cascading effect of channel 4. The DMA master 314a tracks the state of the command register enable bits of the primary and secondary DMA controllers 204 and 202, and the mask bits for channels 0–4, in a set of tracking registers 906. Any masking of channel 4 causes cycles to be spawned to channels 0–3 to set the mask bits of the DMA slave channels. The mask bits in the tracking registers corresponding to channels 0–3 are not changed. Thus, the state of the mask bits of channels 0–3 prior to channel 4 being masked is preserved. Subsequent accesses to the mask bits of channels 0–3 do not cause the DMA master 314*a* to spawn cycles to the DMA slave channels 0–3. Instead, the DMA master 314*a* retains the changes in its tracking registers 906 for later use, if necessary. Thus, as long as channel 4 remains masked, the mask bits of channels 0–3 also reflect a masked status.

If channel 4 is unmasked, the DMA master restores the values stored in the tracking registers 906 to the corresponding channel 0–3 mask registers. It is noted that unmasking of channel 4 does not automatically cause channels 0–3 to be unmasked. Instead, the state of the mask bits in the tracking registers is restored. Thus, when channel 4 is unmasked, the individual mask settings of the channels control.

The effect of disabling channel 4 is similar to masking channel 4. When channel 4 is disabled via the command register of the word-wide DMA controller 204, the DMA master 314*a* causes cycles to be spawned to disable DMA slave channels 0–3. The DMA master 314*a* uses the values stored in the tracking register to assure that only the enable/disable bit is changed. Subsequent changes to the command registers of channels 0–3 are stored in the tracking registers 906. When channel 4 is later enabled, the DMA master 314a uses the values stored in the tracking registers 906 to restore the enable bit of DMA slave channels 0–3.

A master clear command conventionally causes the channels to be enabled and masked. Hence, conventionally, a master clear to the primary DMA controller 204 also enables and masks off channels 0–3 via the cascading of channels 0–3 through channel 4. In the distributed DMA architecture, a master clear to the primary DMA controller 204 is interpreted by the DMA master as if a command and multi-channel mask were received. The DMA master first causes the master clear command to be received by channels 4–7. Next, the DMA master should spawn off a command register write and single-channel mask write to channels 0–3, thereby requiring 11 spawned cycles. However, the preferred embodiment only implements the mask register being set, thereby requiring only 7 spawned cycles. The command register write causes channels 0–3 to be disabled. The single-channel mask command sets the mask bit, thereby masking off DMA requests for the individual channels 0–3. The state of the command and mask registers of channels 0–3 prior to the master clear command is preserved in the tracking registers, as described above. Hence, the cascading effect of masking off channel 4 is maintained. Subsequent disabling or unmasking of channel 4 causes the DMA master to restore the enable or mask bits of channels 0–3 from their respective tracking registers, as described above. Table 16 lists the number of spawned cycles for distributing channel 4 mask and command register changes in parenthesis.

Figure 10:
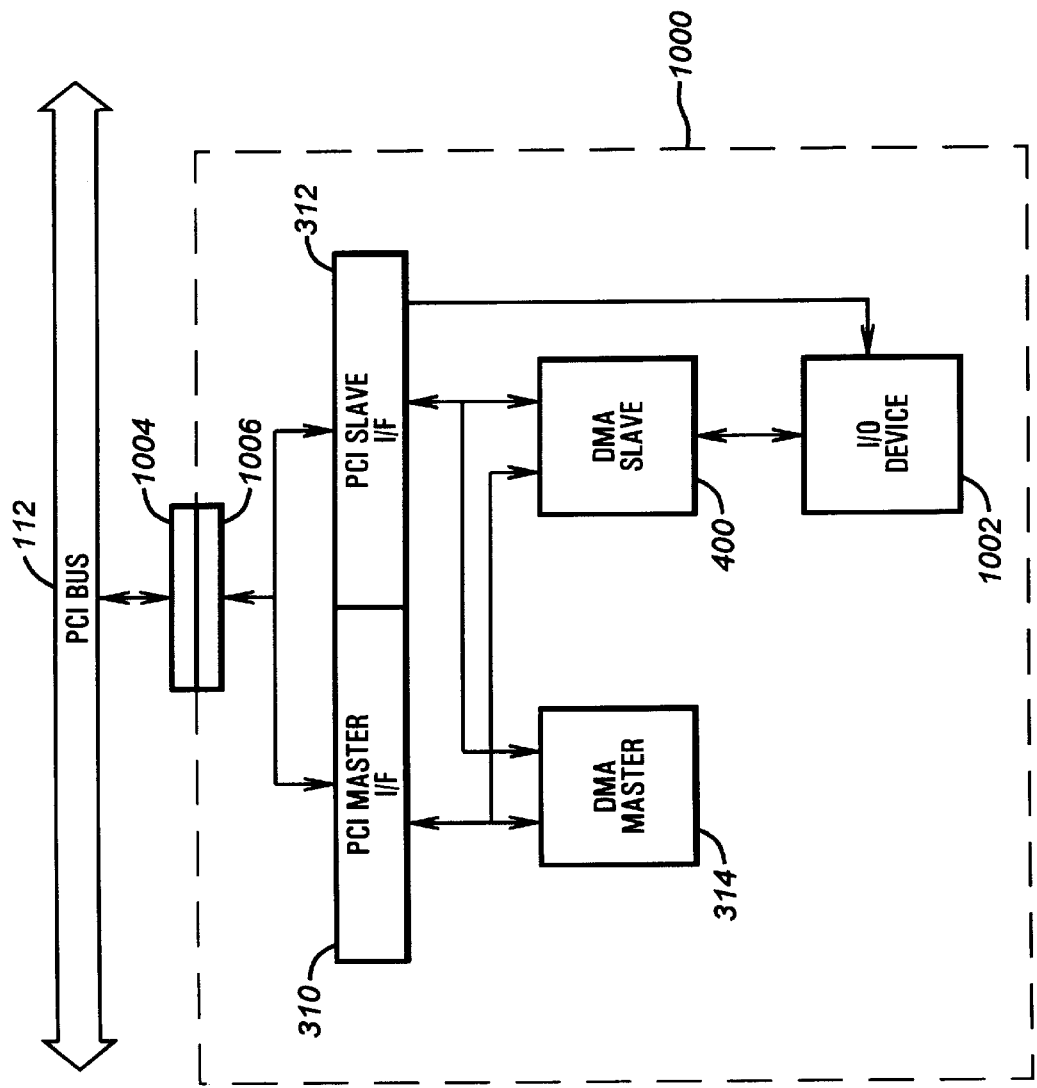
FIG. 10 is a block diagram illustrating an alternative embodiment of the present invention contained on a PCI card for insertion into a computer system not designed for distributed DMA.

Now referring to FIG. 10, there is illustrated an alternative embodiment in which the DMA master 314*a* and DMA slave channel 400 (channel 0 for example) are contained on a PCI card 1000. The PCI card 1000 contains an input/output device 1002 requiring DMA transfers. The PCI card 1000 is connected to the PCI bus 112 via connectors 1004 and 1006. This embodiment of the present invention is compatible with conventional computer systems, such as the computer system C of FIG. 1A, in which a conventional DMA controller 200 is present on the ISA bus 119 by a subtractive decode agent, such as the PCI to ISA bridge device 117. It is noted that in this embodiment, the only distributed DMA support is on the PCI card 1000. During initialization of the PCI card 1000, the configuration software for the PCI card will determine which DMA channel is available for assignment to the DMA slave channel 400. The DMA channel assigned to the DMA slave channel 400 is thereafter unavailable for use by the conventional DMA controllers 200. Hence, the configuration software will set the mask bit pertaining to channel 0 of the conventional DMA controllers 200 in the PCI to ISA bridge 117. For example, if DMA channel 0 is assigned to DMA slave channel 400 of the PCI card 1000, channel 0 of the DMA controller 200 in the PCI to ISA bridge 117 will be unavailable on the ISA bus 119.

The DMA master 314*a* intercepts all conventional DMA controller 200 accesses as defined above, claiming these cycles before the subtractive agent. The cycle is decoded by the decoder 900 (FIG. 9) and a cycle is spawned to the DMA slave channel 0 of the PCI card 1000 by the scheduler 902 and the encoder 904. After the distributed DMA channels are serviced, the DMA master 314 reissues the original host access to the conventional DMA controllers 200 on the PCI bus 112, as described above. However, this time the subtractive decode agent will claim the cycle and access the conventional DMA controller 200 accordingly. The DMA master 314 is responsible for never unmasking or activating any conventional DMA channel assigned to the PCI card 1000 as a distributed DMA slave channel 400. For example, if DMA channel 0 is assigned to the DMA slave channel 400 of the PCI card 1000, the DMA master 314*a* will cause a clear mask command to the conventional DMA controllers 200 to be followed by a single channel mask command to set the mask bit of conventional channel 0. Hence, all commands enabling or unmasking conventional channel 0 are trapped by the DMA master 314*a* so that the conventional channel 0 remains disabled.

The following tables describe the address correspondence between conventional DMA addresses and DMA slave channel addresses and provide bit descriptions of the conventional DMA controllers registers and DMA slave channel registers.

TABLE 6

COMMAND REGISTER

COMMAND REGISTER MAPPING

| I/O address | Byte Device | Conventional Address | 0008h |
|---|---|---|---|
| | | Slave Address | Base + 8h |
| | Word Device | Conventional Address | 00D0h |
| | | Slave Address | Base + 8h |
| Size | | | 8 bits |
| Type | | | Write only |
| Power up | | | 00000000b |

DMA MASTER COMMAND REGISTER

| Bit # | Bit Description |
|---|---|
| 0 | 0 - memory to memory disable |
| | 1 - memory to memory enable |
| 1 | 0 - Channel 0 (byte) or 4 (word) address hold disable |
| | 1 - Channel 0 (byte) or 4 (word) address hold enable |
| | x - if bit 0 = 0 |
| 2 | 0 - Controller enable |
| | 1 - Controller disable |
| 3 | 0 - Normal timing |
| | 1 - Compressed timing |
| 4 | 0 - Fixed priority |
| | 1 - Rotating priority |

TABLE 6-continued

COMMAND REGISTER

| | |
|---|---|
| 5 | 0 - Late write selection |
| | 1 - Extended write selection |
| | x - if bit 3 = 1 |
| 6 | 0 - DREQ sense active high |
| | 1 - DREQ sense active low |
| 7 | 0 - DACK sense active low |
| | 1 - DACK sense active high |

DMA SLAVE COMMAND REGISTER

| Bit # | Bit Description |
|---|---|
| 0 | unused |
| 1 | unused |
| 2 | 0 - Channel enable |
| | 1 - Channel disable |
| 3 | unused |
| 4 | 0 - Fixed priority |
| | 1 - Rotating priority |
| 5 | unused |
| 6 | 0 - DREQ sense active high |
| | 1 - DREQ sense active low |
| 7 | unused |

The DMA master 314a handles processor 100 write cycles to the conventional address of the command register in the special way described above. Four I/O writes are performed to DMA slave command registers if the write cycle is to the secondary DMA controller 202 and three I/O writes are performed to DMA slave command registers if the write is to the primary DMA controller 204. For the DMA channels 400, the function of this register is the same as for the conventional DMA controllers 200.

TABLE 7

MODE REGISTER

MODE REGISTER MAPPING

| I/O address | Byte Device | Conventional Address | 000Bh |
|---|---|---|---|
| | | Slave Address | Base + Bh |
| | Word Device | Conventional Address | 00D6h |
| | | Slave Address | Base + Bh |
| Size | | | 8 bits |
| Type | | | Write only |
| Power up | | | 00000000b |

DMA MASTER MODE REGISTER

| Bit # | Bit Description | |
|---|---|---|
| 0–1 | 00 | Channel 0 (byte) or 4 (word) select |
| | 01 | Channel 1 (byte) or 5 (word) select |
| | 10 | Channel 2 (byte) or 6 (word) select |
| | 11 | Channel 3 (byte) or 7 (word) select |
| 2–3 | 00 - Verify transfer | |
| | 01 - Write transfer | |
| | 10 - Read transfer | |
| | 11 - Illegal | |
| | xx - if bits 6 and 7 = 11 | |
| 4 | 0 - Autoinitialization disable | |
| | 1 - Autoinitialization enable | |
| 5 | 0 - Address increment select | |
| | 1 - Address decrement select | |
| 6–7 | 00 - Demand mode select | |
| | 01 - Single mode select | |
| | 10 - Block mode select | |
| | 11 - Cascade mode select | |

TABLE 7-continued

MODE REGISTER

DMA SLAVE MODE REGISTER

| Bit # | Bit Description |
|---|---|
| 0–1 | N/A |
| 2–3 | 00 - Verify transfer |
| | 01 - Write transfer |
| | 10 - Read transfer |
| | 11 - Illegal |
| | xx - if bits 6 and 7 = 11 |
| 4 | 0 - Autoinitialization disable |
| | 1 - Autoinitialization enable |
| 5 | 0 - Address increment select |
| | 1 - Address decrement select |
| 6–7 | 00 - Demand mode select |
| | 01 - Single mode select |
| | 10 - Block mode select |
| | 11 - N/A |

Data bits 0 and 1 of the conventional DMA address of the mode register indicate which conventional channel to apply the other six bits. The DMA master 314a uses these bits to determine which DMA slave channel 400 will receive this data. The DMA master 314a handles processor 100 writes to this conventional address in the same special way described above. For each individual DMA slave channel 400, data bits 0 and 1 are considered reserved and are written "undefined" by the DMA master 314a. The functionality of the remainder of this register is identical to the conventional DMA controller 200 when applicable.

TABLE 8

REQUEST REGISTER

REQUEST REGISTER MAPPING

| I/O address | Byte Device | Conventional Address | 0009h |
|---|---|---|---|
| | | Slave Address | Base + 9h |
| | Word Device | Conventional Address | 00D2h |
| | | Slave Address | Base + 9h |
| Size | | | 8 bits |
| Type | | | Write only |
| Power up | | | 00000000b |

DMA MASTER REQUEST REGISTERS

| Bit # | Bit Description | |
|---|---|---|
| 0–1 | 00 | Channel 0 (byte) or 4 (word) select |
| | 01 | Channel 1 (byte) or 5 (word) select |
| | 10 | Channel 2 (byte) or 6 (word) select |
| | 11 | Channel 3 (byte) or 7 (word) select |
| 2 | 0 | Reset request bit |
| | 1 | Set request bit |
| 3–7 | N/A | |

DMA SLAVE REQUEST REGISTERS

| Bit # | Bit Description | |
|---|---|---|
| 0–1 | N/A | |
| 2 | 0 | Reset channel request bit |
| | 1 | Set channel request bit |
| 3–7 | N/A | |

Data bits 0 and 1 of the conventional DMA address of the request register indicate which conventional channel to apply the other six bits. The DMA master 314a uses these bits to determine which DMA slave channel 400 will receive the data. The DMA master 314a handles processor 100 writes to this conventional address in the same special way described above. For each individual DMA slave channel 400, data bits 0 and 1 are considered reserved and are written "undefined" by the DMA master 314a. The functionality of the remainder of this register is identical to the conventional DMA controller 200 when applicable.

TABLE 9

SINGLE CHANNEL MASK REGISTER

SINGLE CHANNEL MASK REGISTER MAPPING

| I/O address | Byte Device | Conventional Address | 000Ah |
|---|---|---|---|
| | | Slave Address | Base + Fh |
| | Word Device | Conventional Address | 00D4h |
| | | Slave Address | Base + Fh |
| Size | | | 8 bits |
| Type | | | Write only |
| Power up | | | 00000000b |

DMA MASTER SINGLE CHANNEL MASK REGISTER

| Bit # | Bit Description |
|---|---|
| 0–1 | 00 Channel 0 (byte) or 4 (word) select |
| | 01 Channel 1 (byte) or 5 (word) select |
| | 10 Channel 2 (byte) or 6 (word) select |
| | 11 Channel 3 (byte) or 7 (word) select |
| 2 | 0 Clear mask bit |
| | 1 Set mask bit |
| 3–7 | N/A |

DMA SLAVE MASK REGISTER

| Bit # | Bit Description |
|---|---|
| 0 | 0 Clear channel mask bit |
| | 1 Set channel mask bit |
| 1–7 | N/A |

The single channel mask, clear mask and multi-channel mask registers of the conventional DMA controllers are mapped into a single register called mask. Data bits 0 and 1 of the conventional DMA address of the single channel mask register indicate which conventional channel to apply the other bit. The DMA master 314a uses these bits to determine which DMA slave channel 400 will receive this data. The DMA master 314a handles processor 100 writes to this conventional address in the same special way described above.

According to the preferred embodiment, each DMA slave channel 400 does not have a corresponding single channel mask register. A write to this conventional address causes the DMA master 314a to write to the mask register (described below) in the targeted DMA slave channel 400, with bit 0 carrying the new mask status.

TABLE 10

MULTI-CHANNEL MASK REGISTER

MULTI-CHANNEL MASK REGISTER MAPPING

| I/O address | Byte Device | Conventional Address | 000Fh |
|---|---|---|---|
| | | Slave Address | Base + Fh |
| | Word Device | Conventional Address | 00DEh |
| | | Slave Address | Base + Fh |

TABLE 10-continued

MULTI-CHANNEL MASK REGISTER

| Size | 8 bits |
|---|---|
| Type | Write/Read |
| Power up | 11111111b |

DMA MASTER MULTI-CHANNEL MASK REGISTER

| Bit # | Bit Description |
|---|---|
| 0 | 0 Clear channel 0 (byte) or 4 (word) mask bit |
| | 1 Set channel 0 (byte) or 4 (word) mask bit |
| 1 | 0 Clear channel 1 (byte) or 5 (word) mask bit |
| | 1 Set channel 1 (byte) or 5 (word) mask bit |
| 2 | 0 Clear channel 2 (byte) or 6 (word) mask bit |
| | 1 Set channel 2 (byte) or 6 (word) mask bit |
| 3 | 0 Clear channel 3 (byte) or 7 (word) mask bit |
| | 1 Set channel 3 (byte) or 7 (word) mask bit |
| 4–7 | N/A |

DMA SLAVE MASK REGISTER

| Bit # | Bit Description |
|---|---|
| 0 | 0 Clear channel mask bit |
| | 1 Set channel mask bit |
| 1–7 | N/A |

The single channel mask, clear mask and multi-channel mask registers of the conventional DMA controllers are mapped into a single register called mask. Data bit positions 0–3 of the conventional DMA address to the multi-channel mask register indicate the conventional channels to apply the data to. The DMA master 314a uses these bit positions to determine the DMA slave channels 400 will receive this data. The DMA master device handles processor 100 writes to this conventional address in the same special way described above. There are four I/O slave writes if the conventional address is to the secondary DMA controller 202, and there are three I/O slave writes if the conventional address is to the primary DMA controller 204.

It is the DMA master's responsibility to remap the conventional bits for the DMA slave channel 400 since only bit 0 is valid and the other seven bits are considered reserved and will be written "undefined."

TABLE 11

STATUS REGISTER

STATUS REGISTER MAPPING

| I/O address | Byte Device | Conventional Address | 0008h |
|---|---|---|---|
| | | Slave Address | Base + 8h |
| | Word Device | Conventional Address | 00D0h |
| | | Slave Address | Base + 8h |
| Size | | | 8 bits |
| Type | | | Read only |
| Power up | | | XXXX0000b |

DMA MASTER STATUS REGISTER

| Bit # | Bit Description |
|---|---|
| 0 | 0 TC not reached |
| | 1 Channel 0 (byte) or 4 (word) has reached TC |
| 1 | 0 TC not reached |
| | 1 Channel 1 (byte) or 5 (word) has reached TC |
| 2 | 0 TC not reached |
| | 1 Channel 2 (byte) or 6 (word) has reached TC |

TABLE 11-continued

STATUS REGISTER

| | | |
|---|---|---|
| 3 | 0 | TC not reached |
| | 1 | Channel 3 (byte) or 7 (word) has reached TC |
| 4 | 0 | no request |
| | 1 | Channel 0 (byte) or 4 (word) channel request |
| 5 | 0 | no request |
| | 1 | Channel 1 (byte) or 5 (word) channel request |
| 6 | 0 | no request |
| | 1 | Channel 2 (byte) or 6 (word) channel request |
| 7 | 0 | no request |
| | 1 | Channel 3 (byte) or 7 (word) channel request |

DMA SLAVE STATUS REGISTER

| Bit # | | Bit Description |
|---|---|---|
| 0 | 0 | no request |
| | 1 | Channel has reached TC |
| 1 | | same as bit 0 |
| 2 | | same as bit 0 |
| 3 | | same as bit 0 |
| 4 | 0 | no request |
| | 1 | Channel request |
| 5 | | same as bit 4 |
| 6 | | same as bit 4 |
| 7 | | same as bit 4 |

The DMA master 314*a* handles reads to the conventional address of the status register in the same special way described above. There are four I/O slave reads if the conventional address is to the secondary DMA controller 202, and there are three I/O slave reads if the conventional address is to the primary DMA controller 204. It is the DMA master's responsibility to properly assemble the contents of this register. The DMA slave channels are unaware of which channel they have been assigned to. Therefore, to facilitate assembly, the DMA slave controller 400 echoes the TC bit across bit positions 0–3 and the channel request bit is echoed across bit positions 4–7.

TABLE 12

CLEAR FIRST/LAST FLIP-FLOP

CLEAR FIRST/LAST FLIP-FLOP MAPPING

| I/O address | Byte Device | Conventional Address | 000Ch |
|---|---|---|---|
| | | Slave Address | N/A |
| | Word Device | Conventional Address | 00D8h |
| | | Slave Address | N/A |
| Size | | | 1 bit |
| Type | | | Write only |
| Power up | | | Xb |

A write to this conventional address clears the first, last flip-flop. The write data is irrelevant. The DMA master 314*a* handles a write to this conventional address, and keeps track of the state of this flip-flop. Thus, the DMA slave 400 does not require the flip-flop.

TABLE 13

MASTER CLEAR COMMAND

MASTER CLEAR COMMAND MAPPING

| I/O address | Byte Device | Conventional Address | 000Dh |
|---|---|---|---|
| | | Slave Address | Base + Dh |
| | Word Device | Conventional Address | 00DAh |
| | | Slave Address | Base + Dh |
| Size | | | 0 bits |
| Type | | | Write only |
| Power up | | | N/A |

A write to this conventional address performs the same function as a hardware reset. The data written is irrelevant. The DMA master 314*a* handles processor 100 writes to this conventional address in the same special way described above. There are four I/O slave writes if the conventional address is to the secondary DMA controller 202 and there are three I/O slave writes if the conventional address is to the primary DMA controller 204.

TABLE 14

CLEAR MASK COMMAND

CLEAR MASK COMMAND MAPPING

| I/O address | Byte Device | Conventional Address | 000Eh |
|---|---|---|---|
| | | Slave Address | Base + Fh |
| | Word Device | Conventional Address | 00DCh |
| | | Slave Address | Base + Fh |
| Size | | | 0 bits |
| Type | | | Write only |
| Power up | | | N/A |

The single channel mask, clear mask and multi-channel mask registers of the conventional DMA controllers are mapped into a single register called mask register. A write to this conventional address causes the DMA master 314*a* to write to the mask registers (described above) of the corresponding DMA slave channels 400, with bit 0 set to 0. There are four VO DMA slave channel writes if the conventional address is to the DMA conventional controller 202, and there are three I/O DMA slave channel writes if the conventional address is to the primary DMA controller 204. The act of writing this address enables all four byte DMA channels or all three word DMA slave channels to accept DMA requests. The data written is irrelevant. The DMA master 314*a* handles a write to this register in the same special way described above.

The DMA master 314*a* will respond to and terminate a PCI I/O write to the conventional address of the temporary register and drives the bits "undefined."

TABLE 15

MASK REGISTER

MASK REGISTER MAPPING

| I/O address | Byte Device | Conventional Address | N/A |
|---|---|---|---|
| | | Slave Address | Base + Fh |

TABLE 15-continued

MASK REGISTER

| | Word Device | Conventional Address | N/A |
|---|---|---|---|
| | | Slave Address | Base + Fh |
| Size | | | 1 bit |
| Type | | | Write only |
| Power up | | | 0 |

DMA SLAVE MASK REGISTER

| Bit # | Bit Description |
|---|---|
| 0 | 0  Clear channel mask bit |
| | 1  Set channel mask bit |
| 1–7 | N/A |

The DMA master 314*a* writes to this DDMA register in response to a write to a conventional mask, clear mask or multi-channel mask register. The single channel mask, clear mask and multi-channel mask registers of the conventional DMA controllers are mapped into this DDMA slave register called mask. Each DMA slave channel 400 has an individual mask register.

Figure 12:
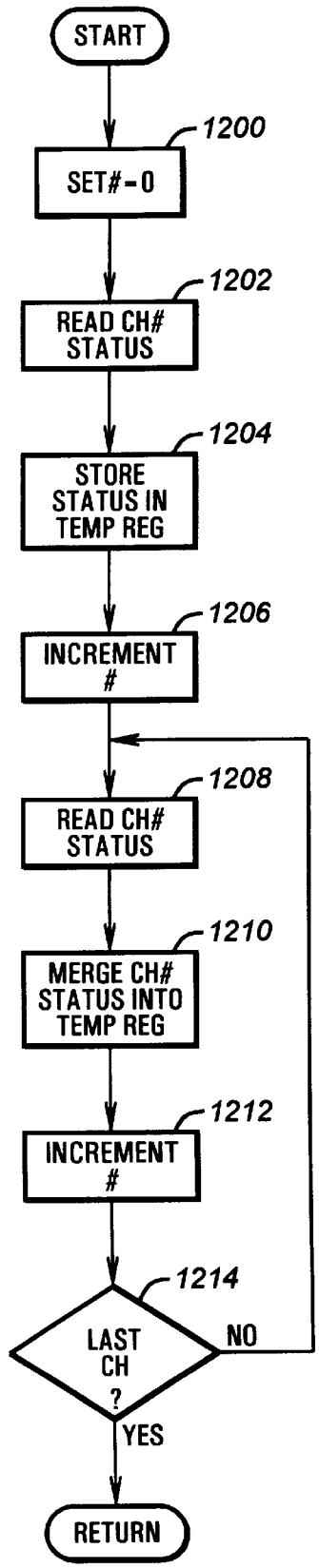
FIG. 12 is a flow diagram illustrating a method of reading status from the distributed, DMA channels according to the preferred embodiment.

Now referring to FIG. 12, there is illustrated a more detailed flow diagram of a sequence of steps performed by the DMA master at step 608 of FIG. 6A, when a conventional status register is read. For this illustration, assume that software has generated a read of the status register for the byte-wide DMA controller 202. The DMA master responds as described in FIG. 6A. At step 608, the DMA master proceeds to step 1200 where an indicator (represented by#) is set to channel 0. At step 1202 the DMA master reads the status of DMA slave channel 0. Recall that since the DMA slave is unaware of which channel it is, the channel responds by placing TC on bits 0–3 and request on bits 4–7. At step 1204 the DMA master stores the information in a 8-bit temporary register. The TC bit for channel 0 is stored in bit 0 and the request bit for channel 0 is stored in bit 4. At step 1206 the indicator is incremented to indicate channel 1. The DMA master reads the status from channel 1, as shown at step 1208, and merges this information into the temporary register. The TC bit for channel 1 is stored in bit 1 and the request bit for channel 1 is stored in bit 5. At step 1212 the indicator is incremented to indicate channel 2. At step 1214, the DMA master determines if any channels remain. If so, steps 1208–1212 are repeated. For a status register read of the byte-wide DMA controller the process is repeated for channels 0–3 and for the word-wide DMA controller the process is repeated for channels 5–7. Channel 4 is the cascade channel and status is not necessary. If at step 1214, the DMA master determines that no channels remain, control returns to step 608 of FIG. 6A and the status stored in the temporary register is reported to software at step 616. Thus, status bits from the individual DMA slave channels 400 are merged to form the information contained in the conventional status register.

TABLE 16

SPAWNED CYCLES FOR ACCESSING CONTROL REGISTERS OF DMA SLAVE CHANNELS 0–3

| Conv'l DMA 0–3 Address | R/W | Register Name | Max. # of Spawned Cycles | Distributed DMA 0–3 offset |
|---|---|---|---|---|
| 0008h | W | Command | 4(7) writes | 08h |
| 0008h | R | Status | 4 reads | 08h |
| 0009h | W | Request | 1 write | 09h |
| 000Ah | W | Mask | 1(5) write | 0Fh |
| 000Bh | W | Mode | 1 write | 0Bh |
| 000Ch | W | Clear Byte Pointer | 0 write | N/A |
| 000Dh | W | Master Clear | 4(7) writes | 0Dh |
| 000Dh | R | Temporary | 0 reads | N/A |
| 000Eh | W | Clear Mask | 4(7) writes | 0Fh |
| 000Fh | R/W | Multi-Channel Mask | 4(7) R/Ws | 0Fh |

TABLE 17

SPAWNED CYCLES FOR ACCESSING BASE ADDRESS AND WORD COUNT REGISTERS OF DMA SLAVE CHANNELS 0–3

| Conventional DMA Channels | | | | | | Max. # of Spawned Cycles | DDMA 0–3 offset |
|---|---|---|---|---|---|---|---|
| Ch0 | Ch1 | Ch2 | Ch3 | R/W | Register Name | | |
| 0000h | 0002h | 0004h | 0006h | W/R | Base Address Low [7:0] | 1 | 00h |
| 0000h | 0002h | 0004h | 0006h | W/R | Base Address High [15:8] | 1 | 01h |
| 0087h | 0083h | 0081h | 0082h | W/R | Low Mem. Page [23:16] | 1 | 02h |
| 0001h | 0003h | 0005h | 0007h | W/R | Word Count Low [7:0] | 1 | 04h |
| 0001h | 0003h | 0005h | 0007h | W/R | Word Count High [15:8] | 1 | 05h |

In the development of the DMA slave channels it is preferable to modify an existing 8237 compatible DMA controller, since it already includes four DMA channels. Of course, it is also possible to design a distributed DMA channel from scratch. The modifications to the 8237 are those which cause the 8237 to act and appear as a single DMA slave channel. As noted above in the register descriptions, the registers of the DMA slave channels 400 do not include channel selection bits. Thus, bits 0–1 of the mode, request and single channel mask registers are non-functional since channels are isolated. The multi-channel mask register is not needed by the DMA slave channels 400 as the single channel mask register, multi-channel mask register and clear mask command are mapped into a DMA slave channel mask register. Each DMA slave channel 400 has its own command register which includes bit 2 for disabling the channel. Each DMA slave channel 400 includes a status register which echoes the TC and request bits across four bit positions when the register is read by the DMA master 314, as described above. Therefore, the 8237 is modified so that each DMA slave channel includes the registers listed in Table 1, and as further described above so that the DMA slave channels may exist singularly in PCI devices, tightly coupled to their input/output devices without sideband signals.

Figure 13A:
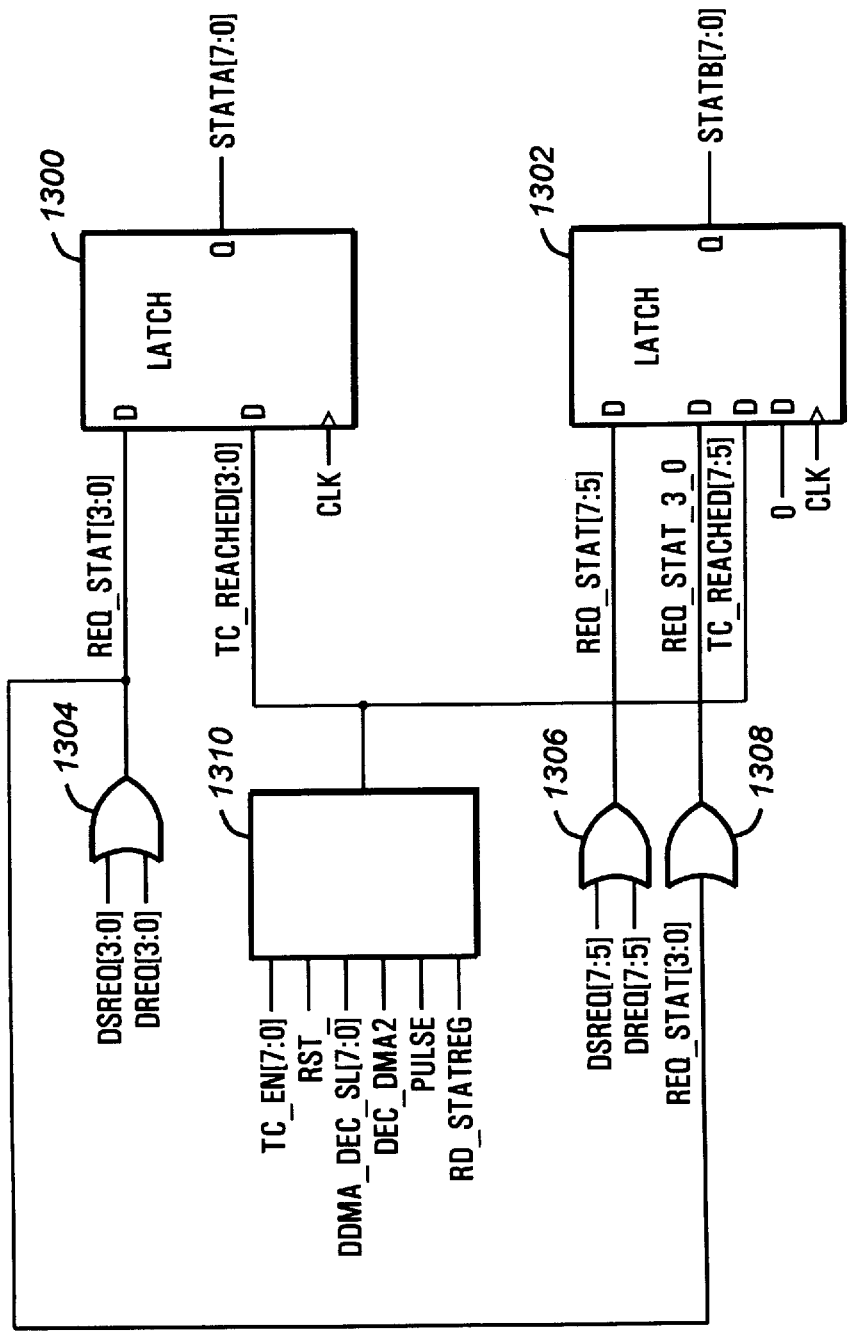
FIGS. 13A–13C are schematic diagrams illustrating the status register of FIG. 5 according to the preferred embodiment.
Figure 13B:
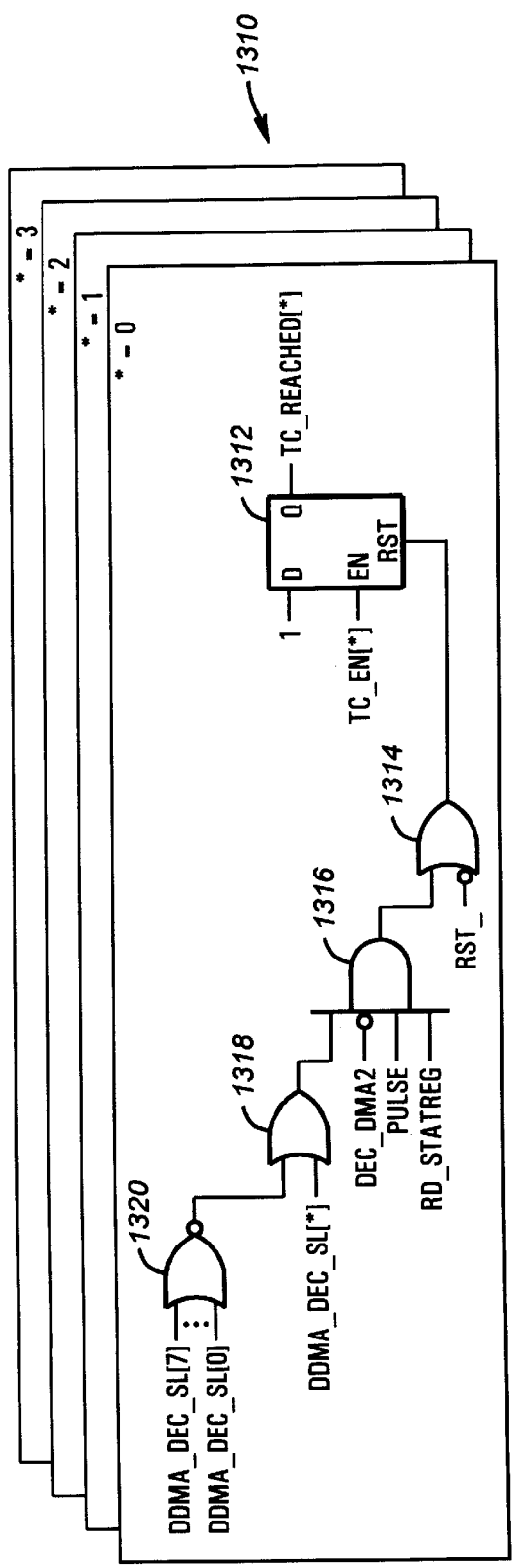
Figure 13C:
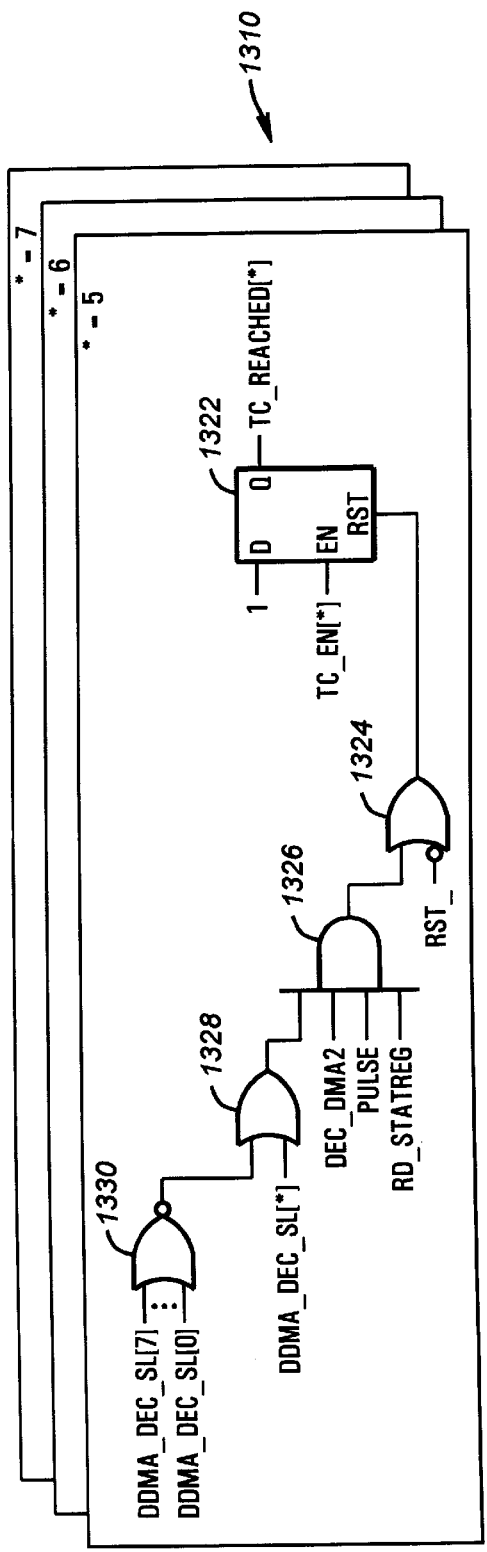

Now referring to FIGS. 13A–13C, there is illustrated logic for the status register 528. It is a function of the conventional DMA controllers to reset the terminal count (TC) bits when the status register is read. In the distributed DMA architecture, only a single TC bit corresponding to the queried channel is cleared.

The PCI slave logic 312 decodes a status read cycle and requests the DMA controller to provide the status for the requested channel. The PCI slave logic 312 takes the received TC and software request bits for the requested channel and echoes the TC bit across the lower nibble and the software request bit across the upper nibble. This modified status byte is provided by the PCI slave logic 312 to the requesting controller. The read operation by the PCI slave logic 312 causes only the TC bit for the requested channel to be cleared.

A status byte A (STATA[7:0]) is provided from a latch 1300 when status is read from channels 3–0. The upper 4 bits of the status byte A are provided by a request status bus (REQ_STAT[3:0]) and the lower 4 bits are provided from a terminal count reached bus (TC_REACHED[3:0]). The REQ_STAT[3:0] bus is provided by an OR function 1304 which receives software request signals (DSREQ[3:0]) and DMA hardware request signals (DREQ[3:0]). Corresponding bits of the DSREQ[3:0] and DREQ[3:0] buses are ORed together to produce the REQ_STAT[3:0] bus. The TC_REACHED[7:5, 3:0] signals are provided from a plurality of storage units 1310, with TC_REACHED[3:0] coupled to latch 1300 and TC_REACHED[7:5] coupled to a latch 1302. The storage units 1310 are discussed further in FIG. 13B.

A status byte B (STATB[7:0]) is provided from the latch 1302 when status is read from channels 5–7. A request status bus REQ_STAT[7:5:] is provided from an OR function 1306 to D inputs of the latch 1302. The OR function 1306 receives software request signals (DSREQ[7:5]) and DMA hardware request signals (DREQ[7:5]). Corresponding bits of the DSREQ[7:5] and DREQ[7:5] buses are ORed together to produce the REQ_STAT[3:0] bus. At latch 1302, a fourth request status signal (REQ_STAT_3_0) is generated by ORing the signals of the REQ_STAT[3:0] bus with an OR gate 1308. Hence, the request status of channels 3–0 are reflected in channel 4 request status. The least significant terminal count signal is pulled low at a D input of the latch 1302.

Now referring to FIG. 13B and 13C, there is illustrated two instances of the terminal count storage unit 1310. It is noted that there are seven total instances of the storage unit 1310, with four instances of the logic of FIG. 13B (corresponding to channels 3–0) and three instances of the logic of FIG. 13C (corresponding to channels 7–5). For each instance of FIG. 13B, an "*" symbol takes on a value of 3, 2, 1 or 0. For each instance of FIG. 13C, the "*" symbol takes on a value of 7, 6 or 5. For example, for channel 0 a latch 1312 provides the TC_REACHED[0] signal from a Q output of the latch 1312. An enable input of the latch 1312 latches a high value at a D input when a terminal count enable (TC_EN[0]) signal is asserted high. The Q output of the latch 1312 is reset to zero when an output of an OR gate 1314 is asserted high. The output of the OR gate 1314 is asserted under two conditions: a system reset (RST_) is asserted low or an output of an AND gate 1316 is asserted high.

The AND gate 1316 receives a read status register (RD_STATREG) signal, a write pulse (PULSE) signal, a primary DMA controller decoded (DEC_DMA2) signal and an output of an OR gate 1318. The OR gate 1318 receives a distributed DMA channel decode (DDMA_DEC_SL[0]) and an inverted output of an OR gate 1320 which receives all of the signals of the DDMA_DEC_SL[7:0] bus. Hence, the AND gate 1316 provides an asserted signal when either the status register is read with no distributed DMA channels decoded or when status for the distributed DMA channel 0 is read.

Channel 5 is used as an example to describe the logic of FIG. 13C. A latch 1322 provides the TC_REACHED[0] signal from a Q output of the latch 1322. An enable input of the latch 1322 latches a high value at a D input when a terminal count enable (TC_EN[0]) signal is asserted high. The Q output of the latch 1322 is reset to zero when an output of an OR gate 1324 is asserted high. The output of the OR gate 1324 is asserted under two conditions: a system reset (RST_) is asserted low or an output of an AND gate 1326 is asserted high.

The AND gate 1326 receives a read status register (RD_STATREG) signal, a write pulse (PULSE) signal, a primary DMA controller decoded (DEC_DMA2) signal and an output of an OR gate 1328. The OR gate 1328 receives a distributed DMA channel decode (DDMA_DEC_SL[0]) and an inverted output of an OR gate 1330 which receives all of the signals of the DDMA_DEC_SL[7:0] bus. Hence, the AND gate 1326 provides an asserted signal when either the status register is read with no distributed DMA channels decoded (conventional status register read) or when status for the distributed DMA channel 5 is read.

Thus, the latches 1312 and 1322 are reset by a system reset or a conventional status register read. If distributed DMA is enabled and a distributed DMA channel status register read is performed, only the terminal count bit corresponding to the distributed DMA channel is reset, thereby leaving the remaining terminal count bits unchanged.

Now referring to FIGS. 14A–14D, there is illustrated logic for the command registers 534. It is noted that in both MISC-L 118a and MISC-E 118b, the primary and secondary DMA controllers are present. The DMA controllers are selectable for either a conventional mode and a distributed DMA mode. In FIGS. 14A–E, signals associated with the primary controller are denoted with an "A" and signals associated with the secondary controller are denoted with a "B".

Figures 14A, 14B, 14C:
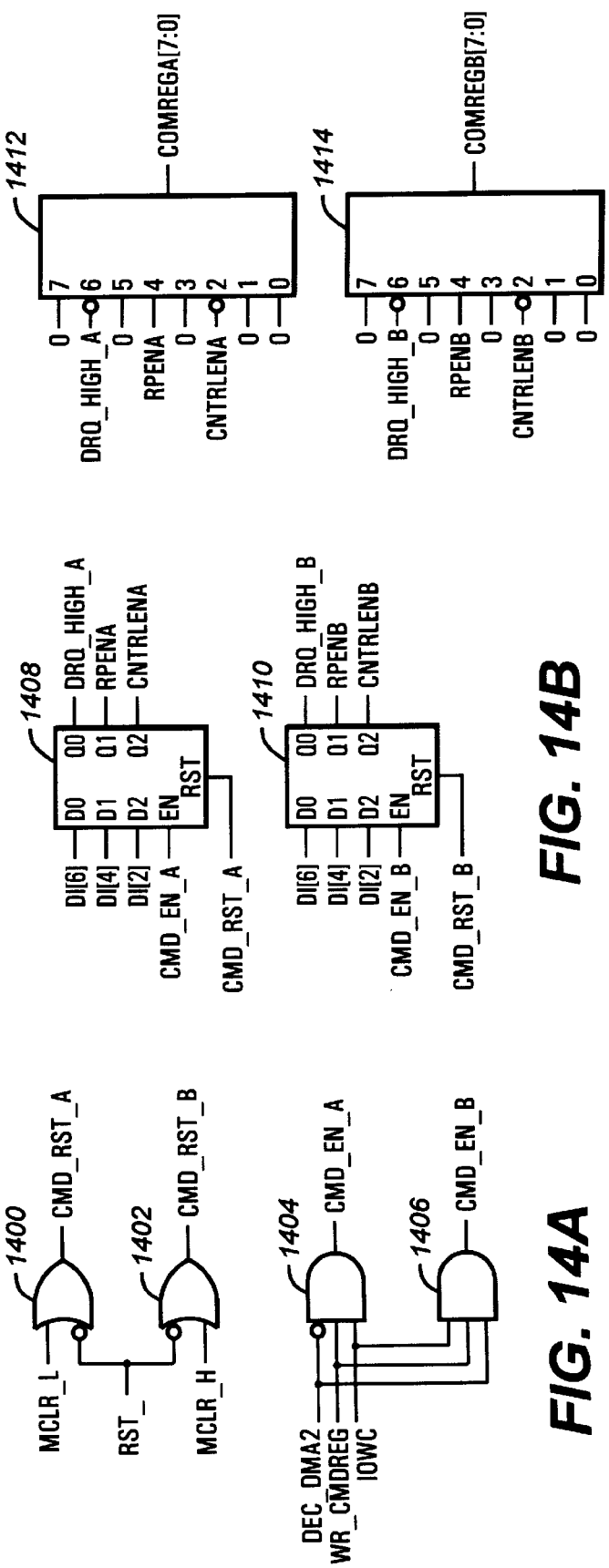
FIGS. 14A–14G are schematic diagrams illustrating the command register of FIG. 5 according to the preferred embodiment.

In FIG. 14A, a system reset (RST_) signal is received into an inverted input of an OR gate 1400 and an OR gate 1402. A second input of the OR gate 1400 receives a master clear low (MCLR_L) signal which is provided when a master clear command is received by the lower or secondary DMA controller. These two signals are combined by the OR gate 1400 to produce a command reset A (CMD_RST_A) signal. A second input of the OR gate 1402 receives a master clear high (MCLR_H) signal which is provided when a master clear command is received by the upper or primary DMA controller. The signals received into OR gate 1402 are combined to produce a command reset B (CMD_RST_B) signal.

A pair of command enable signals are produced by AND gates 1404 and 1406. A decode primary DMA (DEC_DMA2) signal is received into an inverted input of the AND gate 1404 and an input of AND gate 1406. A write command register (WR_CMDREG) signal and a input/output write cycle (IOWC) signal are received into AND gates 1404 and 1406. If DEC_DMA2 is low, indicating the cycle is to the secondary DMA controller, an I/O write cycle to the command register causes the CMD_EN_A signal to be asserted. If DEC_DMA2 is high, indicating the cycle is to the primary DMA controller, an I/O write cycle to the command register causes the CMD_EN_B signal to be asserted.

In FIG. 14B, the CMD_EN_A, CMD_EN_B, CMD_RST_A and CMD_RST_B signals are received into latches 1408 and 1410. The latch 1408 receives the CMD_EN_A signal into an enable input, the CMD_RST_A signal into a reset input, and data bits 6, 4, and 2 of a data bus (DI) into three D inputs of the latch. When CMD_EN_A is high the data bits are latched producing three signals: a DMA request sense high A (DRQ_HIGH_A) signal, a rotating priority enable A (RPENA) signal, and a controller enable A (CNTRLENA) signal. These three signals along with zeroed signals are combined, as graphically shown in element 1412, to form a command register (COMREGA[7:0]) for the secondary DMA controller. The latch 1410 receives the CMD_EN_B signal into an enable input, the CMD_RST_B signal into a reset input, and data bits 6, 4, and 2 of a data bus (DI) into three D inputs of the latch. When CMD_EN_B is high the data bits are latched producing three signals: a DMA request sense high B (DRQ_HIGH_B) signal, a rotating priority enable B (RPENB) signal, and a controller enable B (CNTRLENB) signal. These three signals along with zeroed signals are combined, as graphically shown in element 1414, to form a command register (COMREGB[7:0]) for the primary DMA controller.

Figure 14D:
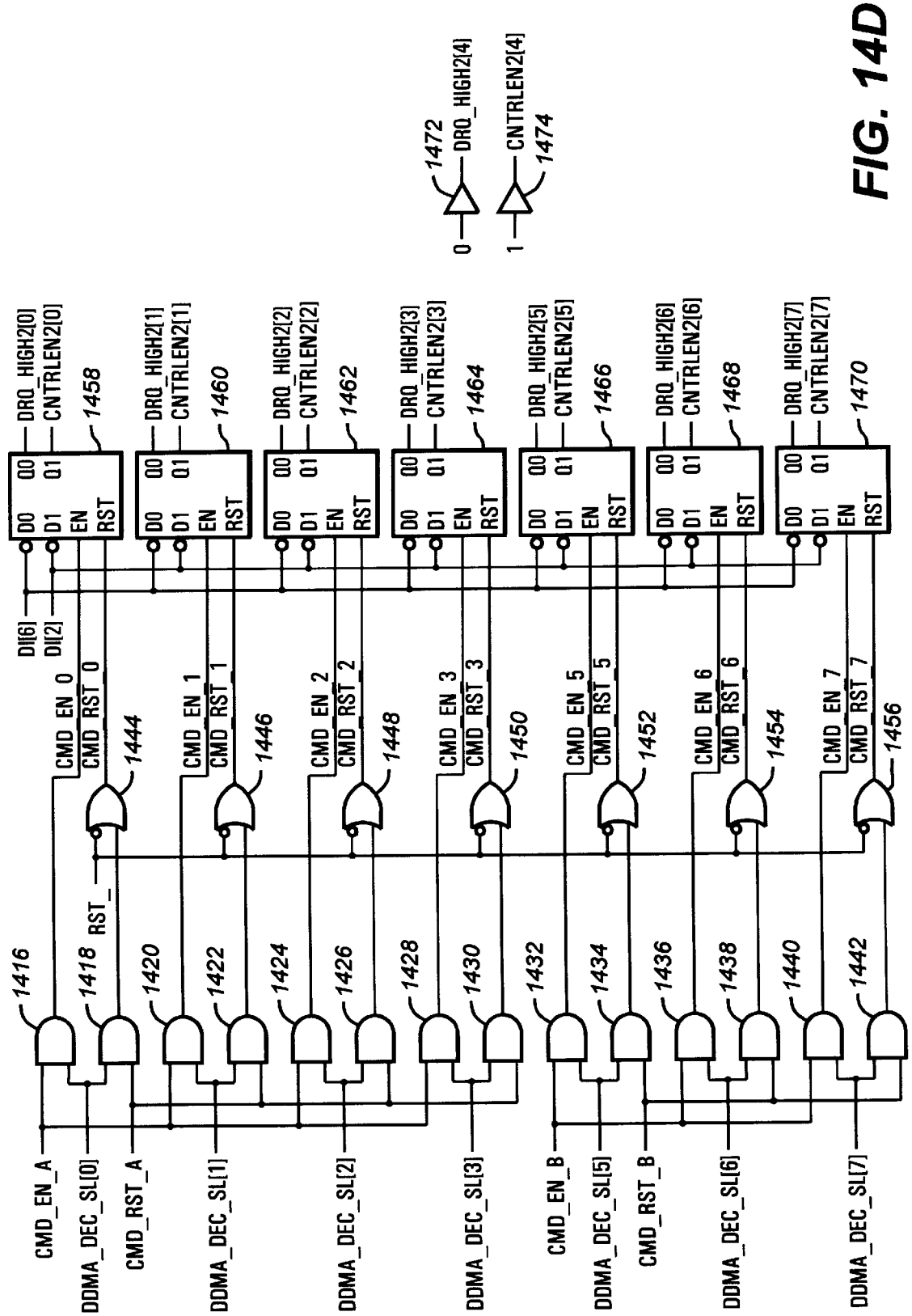

In FIG. 14D, an alternative to the command registers 1412 and 1414 is illustrated for distributed DMA uses in which a set of controller enable (CNTRLEN2[7:0]) and DMA request sense high (DRQ_HIGH2[7:0]) signals are provided. In distributed DMA mode, each DMA slave channel of MISC 118 receives an independent controller enable and DMA request sense high signal.

Each of a number of latches 1470–1458, provide one of the seven CNTRLEN2[7:0] and DRQ_HIGH2[7:0] signals. Latches 1470–1458 correspond to bits 7–0 respectively. Each of the latches 1470–1458 receive input data (DI[6,2]) into D inputs when a respective command enable (CMD_EN_7:CMD_EN_0) signal is asserted. The value latched in from DI[6] provides the DRQ_HIGH2[7:0] signals and the value latched in from DI[2] provides the CNTRLEN2[7:0] signals. The Q outputs of the latches 1470–1458 are reset to zero when a respective command reset (CMD_RST_7:CMD_RST_0) signal is received.

The CMD_EN_0:CMD_EN_3 signals are provided from AND gates 1416, 1420, 1424 and 1428 respectively. Each of the AND gates 1416, 1420, 1424 and 1428 receive the CMD_EN_A signal which is individually qualified with one of four distributed DMA decode select (DDMA_DEC_SL[0:3]) signals. The CMD_EN_5:CMD_EN_7 signals are provided from AND gates 1432, 1436 and 1440 respectively. Each of the AND gates 1432, 1436 and 1440 receive the CMD_EN_B signal which is individually qualified with one of three distributed DMA decode select (DDMA_DEC_SL[5:7]) signals. Thus, in distributed DMA mode, a command register write will affect only the selected distributed DMA channel.

The CMD_RST_0:CMD_RST_3 signals are provided from OR gates 1444, 1446, 1448 and 1450 respectively. Each of the OR gates 1444, 1446, 1448 and 1450 receive the system reset (RST_) signal into an inverted input of the OR gates for causing the latches 1458–1464 to be reset. A second input of the OR gates 1444–1450 receives an output of an AND gate 1418, 1422, 1426 and 1430 respectively. The CMD_RST_A signal is received into a first input of AND gates 1418, 1422, 1426 and 1430. A second input of AND gates 1418, 1422, 1426 and 1430 receive one of the four DDMA_DEC_SL[0:3] signals respectively. The CMD_RST_5:CMD_RST_7 signals are provided from OR gates 1452, 1454 and 1456 respectively. Each of the OR gates 1452, 1454 and 1456 receive the system reset (RST_) signal into an inverted input of the OR gates for causing the latches 1466–1470 to be reset. A second input of the OR gates 1452–1456 receives an output of an AND gate 1434, 1438 and 1442 respectively. The CMD_RST_B signal is received into a first input of AND gates 1434, 1438 and 1442. A second input of AND gates 1434, 1438 and 1442 receive one of the three DDMA_DEC_SL[5:7] signals respectively. As noted above, channel 4 is not usable and therefore buffers 1472 and 1474 drive a DRQ_HIGH2[4] and CNTRLEN[4] low. Thus, the command register corresponding to a particular distributed DMA channel, such as channel 0, is selectively reset when distributed DMA mode is enabled and a master clear command is issued to the DMA slave channel.

Figure 14E:
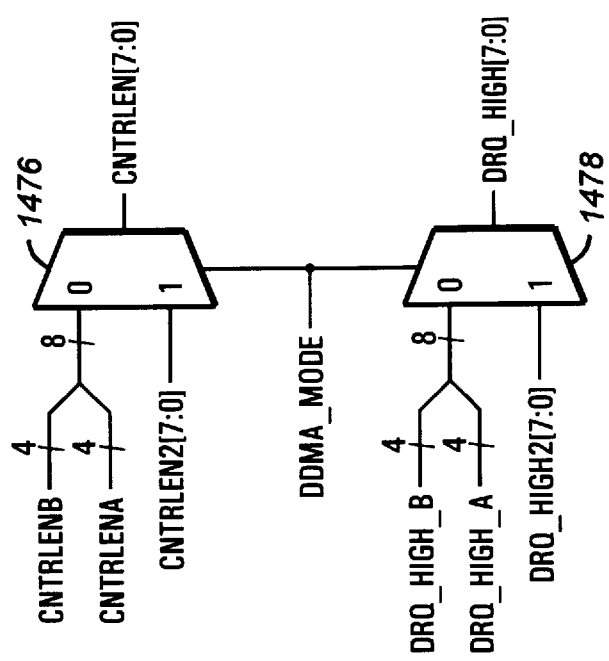

In FIG. 14E, a multiplexor 1476 provides a controller enable (CNTRLEN[7:0]) bus according to the distributed DMA mode (DDMA_MODE) signal. If distributed DMA is enabled, the CNTRLR2[7:0] bus is passed as the CNTRLEN [7:0] bus. If distributed DMA is not enabled, the value of the control enable bit of the primary DMA controller command register (CNTRLENB) is placed on the upper four signals of CNTRLEN[7:0] and the value of the control enable bit of the secondary DMA controller command register (CNTRLENA) is placed on the lower four signals of the CNTRLEN[7:0] bus. A multiplexor 1478 provides a DMA request high sense (DRQ_HIGH[7:0]) bus according to the distributed DMA (DDMA_MODE) signal. If distributed DMA is enabled, the DRQ_HIGH2[7:0] bus is passed as the DRQ_HIGH[7:0] bus. If distributed DMA is not enabled, the value of the DMA request high sense bit of the primary DMA controller command register (DRQ_HIGH_B[7:0]) is placed on the upper four signals of DRQ_HIGH[7:0] and the value of the DMA request high sense bit of the secondary DMA controller command register (DRQ_HIGH_A[7:0]) is placed on the lower four signals of DRQ_HIGH[7:0]. The DRQ_HIGH[7:0] signals are used by each channel of the DMA controller in both modes to determine whether the DREQ inputs are sensed active high or active low.

Figure 14G:
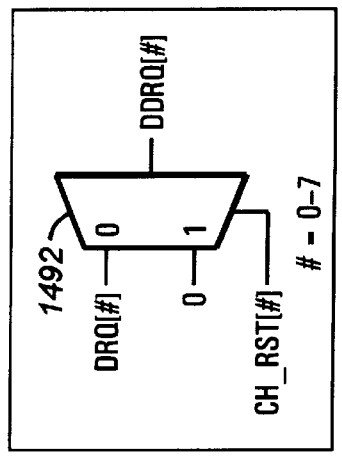
Figure 14F:
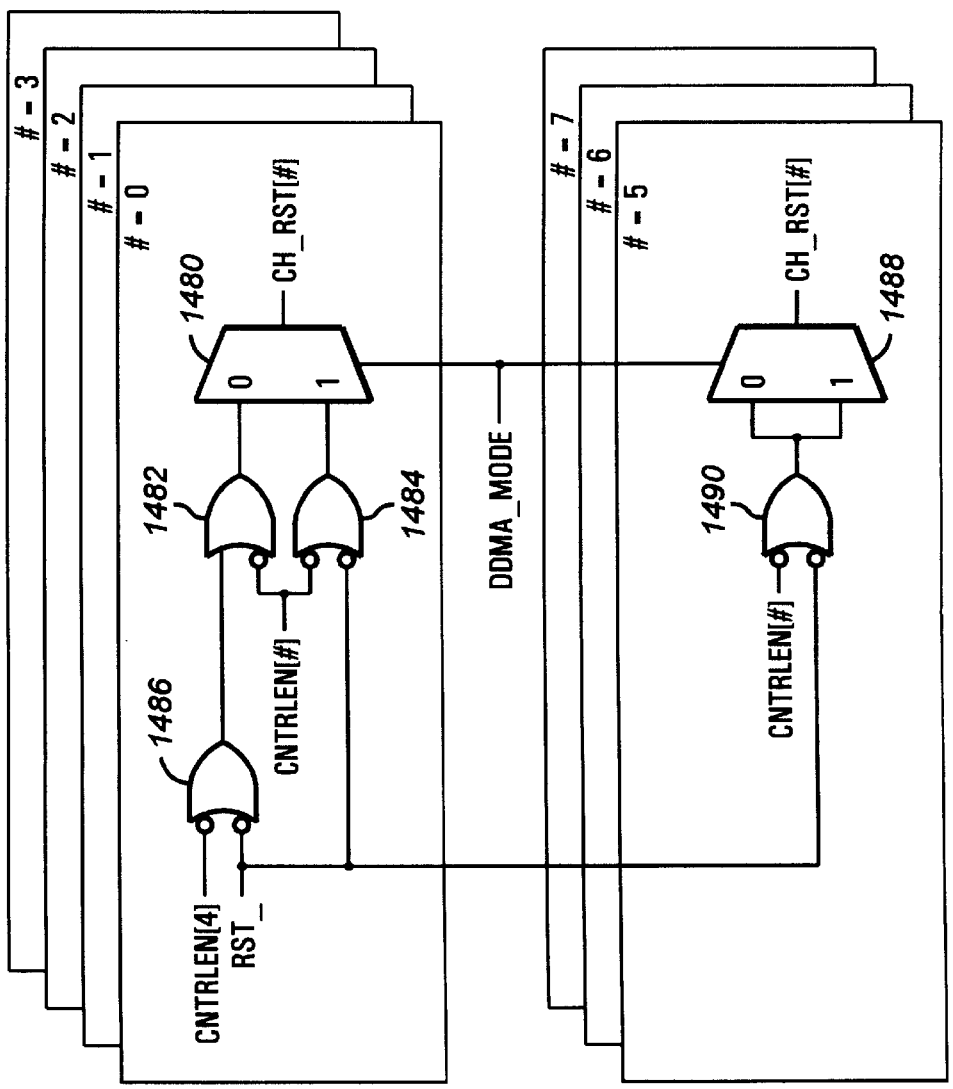

The CNTRLEN[7:0] signals effect whether the DMA channels will respond to a DMA request. In FIGS. 14F and 14G, there is illustrated multiplexing logic for disabling the DMA request signals if the DMA channel is disabled. Multiplexors 1480 and 1488 provide a channel reset (CH_RST[7:0]) bus which causes the DMA request signals to be disabled. For simplicity, a single instance of the circuitry for channels 0–3 and 5–7 is illustrated. The "#" symbol is used to represent a channel number for each instance. Multiplexors 1480 and 1488 receive the DDMA_MODE signal. A zero input of the multiplexor 1480 receives an output from an OR gate 1482. A one input of the multiplexor 1480 receives an output from an OR gate 1484. The CNTRLEN [#] signal, such as CNTRLEN[0], is received into inverted inputs of the OR gates 1482 and 1484. A second input of the OR gate 1482 receives an output of an OR gate 1486. The CNTRLEN[4] is received into a first inverted input of the OR gate 1486 and the RST_ signal is received into a second inverted input of the OR gates 1486 and 1484. Thus, when distributed DMA mode is not enabled and the CNTRLEN[4] signal is low, the CH_RST[3:0] signals are high. If CNTRLEN[4] is high, then the CNTRLEN[3:0] signals are inverted and passed to the CH_RST[3:0] signals. If distributed DMA mode is enabled, the CNTRLEN[3:0] signals are inverted and passed to the CH_RST[3:0] signals.

A zero and one input of the multiplexor 1488 are tied to an output of an OR gate 1490. The CNTRLEN[#] signal, such as CNTRLEN[5], is received into an first inverted input of the OR gate 1490. A second inverted input of the OR gate 1490 receives the RST_ signal. Thus, providing the RST_ signal is not asserted, the CNTRLEN[5:7] signals are always inverted and passed to the CH_RST[5:7] signals.

Figure 15C:
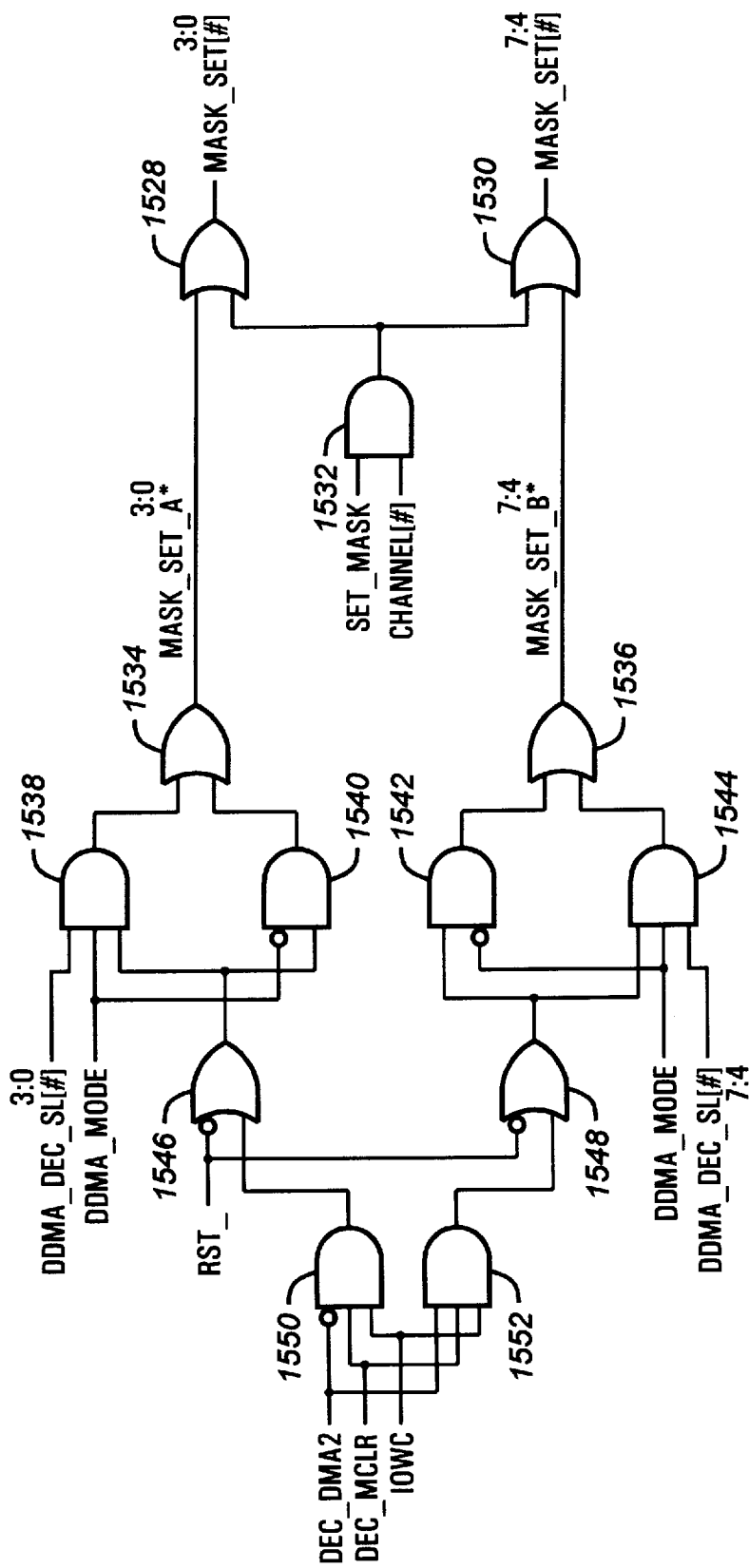

In FIG. 14G, there is illustrated how the CH_RST[7:0] signals force a respective DMA request (DRQ[#]) signal low or inactive when the corresponding CH_RST[#] signal is set high. Thus, if the DMA controller is disabled in the command register, the DMA request inputs are masked off Now referring to FIGS. 15A–15E, there is illustrated logic for the mask register 536. In these figures, a "#," "*L" or "*H" symbol is used to simplify the illustration of identical circuitry for different channels. Between channels, the only difference in the circuitry is the channel number designation of the signals containing the symbols. In FIG. 15A, a set of OR gates 1500 provide a mask clock (MASK_A_CLK[3:0]) bus corresponding to the secondary DMA controller. A set of OR gates 1502 provide a mask clock (MASK_B_CLK[7:4]) bus corresponding to the primary DMA controller. Now referring to a single channel, a first input of the OR gate 1500 is connected to an output of an AND gate 1504 and a second input of the OR gate 1500 is connected to an output of an AND gate 1506. A first input of the OR gate 1502 is connected to an output of an AND gate 1508 and a second input of the OR gate 1502 is connected to an output of an AND gate 1510. Each of the AND gates 1504–1510 receive an output of an OR gate 1512. The OR gate 1512 receives a set mask bit decode (DEC_SMB) signal corresponding to a single channel write mask command, a set all mask bits decode (DEC_AMB) signal corresponding to a write all mask command and a clear mask register command (DEC_CLRMSK) signal.

An upper DMA controller decode (DEC_DMA2) signal is asserted when the primary DMA controller is accessed or selected. The DEC_DMA2 signal is received into an inverted input of the AND gate 1504, an inverted input of the AND gate 1506, an input of AND gate 1508 and an input of AND gate 1510. The DMA_MODE signal is received into AND gates 1504 and 1508; and is received into inverted inputs of AND gates 1506 and 1510. The IOWC signal is received into AND gates 1504–1510. The DDMA_DEC_SL[*L] signal, such as DDMA_DEC_SL[0], is received into AND gate 1504. The DDMA_DEC_SL[*H] signal, such as DDMA_DEC_SL[5], is received into AND gate 1508. Thus, a MASK_$_A$_CLK[*L] signal and MASK_B_CLK[*H] signal is generated when a write single mask command, a write all mask command or a clear mask command is received from the processor 100.

In FIG. 15B, an inverted output of an AND gate 1512 provides a mask enable (MASK_A_EN) signal corresponding to the secondary DMA controller. An inverted output of an AND gate 1514 provides a mask enable (MASK_B_EN) signal corresponding to the primary DMA controller. Each of the AND gates 1512 and 1514 receive the DEC_CLRMSK signal. The DEC_DMA2 signal is received into an inverted input of the AND gate 1512 and an input of the AND gate 1514. Thus, the clear mask command is qualified by DMA controller selected.

An AND gate 1516 provides a mask select (MASK_A_SELA) signal and an AND gate 1518 provides a mask select (MASK_B_SELA) signal. The MASK_A_SELA signal corresponds to the secondary DMA controller and the MASK_B_SELA signal corresponds to the primary DMA controller according to the DEC_DMA2 signal. Each of the AND gates 1516 and 1518 receive the DEC_AMB signal.

An set of AND gates 1520 provide individual mask select (MASK_A_SELB[3:0]) signals according to a selected DMA channel (CHANNEL[3:0]), such as channel 0, and an output of a set of AND gates 1522. Each AND gate 1522 receives an inverted DEC_DMA2 signal and the DEC_SMB signal. A set of AND gates 1524 provide individual mask select (MASK_B_SELB[7:4]) signals according to a selected DMA channel (CHANNEL[7:4]) and an output of a set of AND gates 1526. Each AND gate 1526 receives the DEC_DMA2 and DEC_SMB signals.

In FIG. 15C, a mask set (MASK_SET[#]) bus is generated for resetting the mask bits. In this figure channels 0 and 7 are used for describing the circuitry, but it is understood that each channel has this circuitry. An OR gate 1528 provides the MASK_SET[0] signal. A first input of the OR gate 1528 is connected to an output of an AND gate 1532 and a second input of the OR gate 1528 is connected to an output of an OR gate 1534. The OR gate 1534 has a first input connected to an output of an AND gate 1538 and a second input connected to the AND output of an AND gate 1540. An output of an OR gate 1546 is connected to one input of the AND gate 1538 and one input of the AND gate 1540. The DDMA_MODE signal is connected to a non-inverted input of AND gate 1538 and an inverted input of AND gate 1540. AND gate 1538 receives a DDMA_DEC_SL[0] signal. The OR gate 1546 has one input has an inverted input connected to the RST_ signal and a second input connected to an output of an AND gate 1550. The AND gate 1550 has an inverted input receiving the DEC_DMA2 signal, a second input receiving the DEC_MCLR signal and a third input receiving the IOWC signal. Thus, the MASK_SET[0] signal can be asserted alone if the DDMA_DEC_SL[0] signal is asserted collectively with the master clear command.

An OR gate 1530 provides the MASK_SET[7] signal. A first input of the OR gate 1530 is connected to the output of the AND gate 1532. In a second input of the OR gate 1530 is connected to the output of an OR gate 1536. The OR gate 1536 has a first input connected to an output of an AND gate 1542 and a second input connected to an output of an AND gate 1544. An output of an OR gate 1548 is connected to an input of both AND gates 1542 and 1544. The DDMA_MODE signal is connected to a non-inverted input of the AND gate 1544 and an inverted input of the AND gate 1542. The DDMA_DEC_SL[7] signal is connected to a third input of the AND gate 1544. The OR gate 1548 has an inverted input connected to the RST_ signal and a second input connected to an output of an AND gate 1552. The AND gate 1552 has a first input connected to the DEC_DMA2 signal, a second input connected to the DEC_MCLR signal and a third input connected to the IOWC signal. Thus, the MASK_SET[7] signal may be asserted alone if the DEC_SL[7] signal is asserted or collectively if the master clear command is given and distributed DMA mode is not enabled.

Figure 15D:
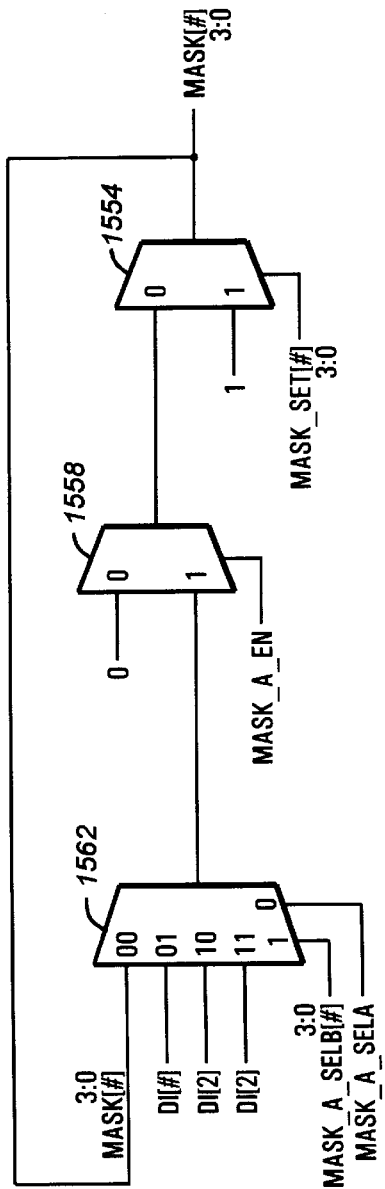
Figure 15E:
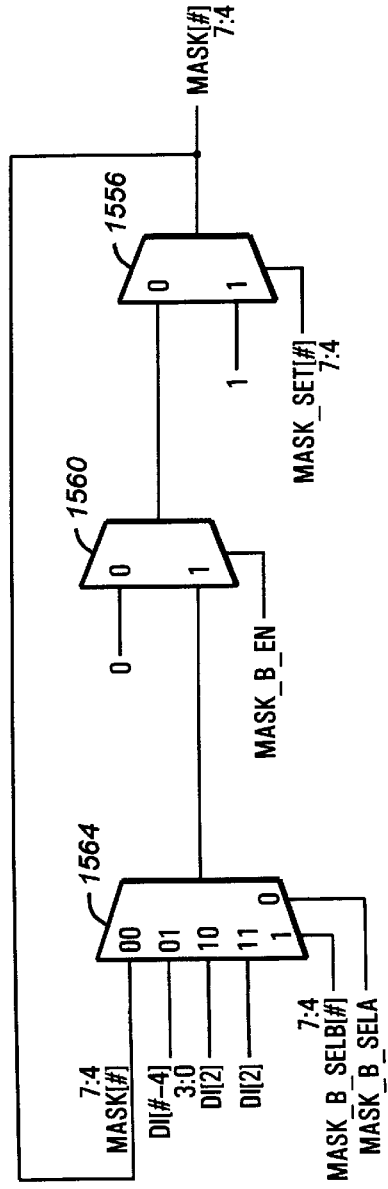

In FIGS. 15D and 15E the mask bits (MASK[7:0]) bits of the mask registers are provided. In FIG. 15D, channel 0 is used to describe the circuitry, but it is understood that channels 0–3 have this common circuitry. In FIG. 15D a multiplexor 1554 provides the MASK[0] signal. The MASK_SET[0] signal selects one of two inputs to be passed by the multiplexor 1554. A 1 input is connected to a high level and a 0 input is connected to an output of a multiplexor 1558. The multiplexor 1558 has a select input connected to the MASK_A_EN signal, a 0 input connected low and a 1 input connected to an output of a multiplexor 1562. The multiplexor 1562 has a least significant select input connected to the MASK_A_SELA signal and a most significant select input connected to the MASK_A_SELB[0] signal. The multiplexor 1562 selects from one of four inputs: a 0 input is connected to the output of the multiplexor 1554, a 1 input is connected to bit 0 of an input data bus, input 2 is connected to bit 2 of the input data bus and a third input is connected to bit 2 of the input data bus.

In FIG. 15E a multiplexor 1556 provides the MASK[7] signal. The MASK_SET[7] signal is connected to a select input of the multiplexor 1556 for selecting one of two inputs. A 0 input of the multiplexor 1556 is connected to an output of a multiplexor 1560 and a 1 input of the multiplexor 1556 is connected high. The MASK_B_EN signal is connected to a select input of the multiplexor 1560 for selecting from one of two inputs. A 0 input of the multiplexor 1560 is connected low and a 1 input is connected to an output of a multiplexor 1564. The multiplexor 1564 has a least significant select input connected to the MASK_B_SELA signal and a most significant select input connected to the MASK_B_SELB[7] for selecting from one of four inputs. A first input of the multiplexor 1564 is connected to the output of the multiplexor 1556, a second input is connected to bit 3 of the input data bus, a third and fourth inputs are connected to bit 2 of the input data bus. It is noted that the second input of the multiplexor 1564 receives data bits 3–0 corresponding to MASK[7:4].

Now turning to changes that concern an addressing mechanism of the DMA slave channels, it is noted that according to Table 1, the DMA slave channel registers are remapped. In the conventional DMA controller, a byte pointer 542 is used to toggle between an even and odd address because the addressing mechanism does not receive a least significant address signal. When accessing the address generation registers 514–520, the byte pointer 542 toggles between pointing to a lower byte and an upper byte of a 16-bit register. With the remapping of the registers of the DMA slave channels, it is preferrable to access each byte without having to determine which byte the byte pointer is presently pointing to. In the preferred embodiment, the DMA slave logic 312 includes logic to transparently handle the byte pointer. An alternative to the preferred embodiment includes modifying the 8237 compatible logic to remove the byte pointer and bring in a least significant address signal.

Figure 16:
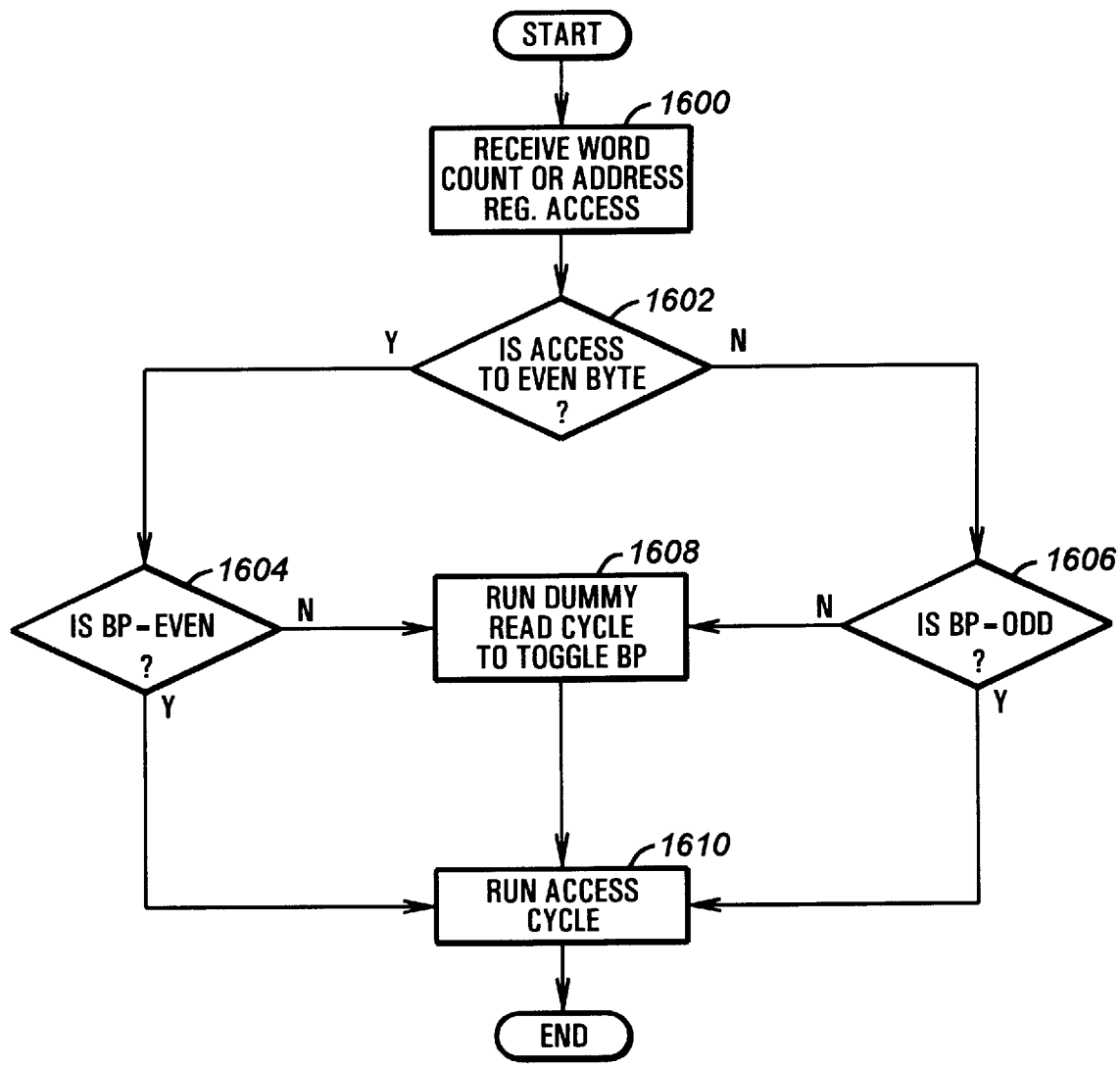
FIG. 16 is a flow diagram illustrating a method of addressing a distributed DMA slave channel according to the preferred embodiment.

Now referring to FIG. 16, the logic and method of the DMA slave logic 312 is described. An access cycle, such as a word count register write operation, is received into the DMA slave logic 312 at a step 1600. At step 1602, the DMA slave logic next determines if the access cycle is directed to an even address boundary or an odd address boundary. If the access cycle is to an even byte boundary, the DMA slave logic next determines if the byte pointer (BP) is set to an even address boundary. If so, at step 1604, the DMA slave logic 312 proceeds to pass the access cycle to the addressed DMA slave channel 400.

If at step 1602, it was determined that the access cycle is directed to an odd address boundary, the DMA slave logic next determines if the byte pointer (BP) is set to an odd address boundary. If so, at step 1606, the DMA slave logic 312 proceeds to pass the access cycle to the addressed DMA slave channel 400.

If at step 1604 it was determined that the byte pointer is set to an odd address boundary or at step 1606 it was determined that the byte pointer is set to an even address boundary, the DMA slave logic 312 at step 1608 performs a dummy read cycle to one the address generation registers 514–520. The dummy cycle causes the DMA slave channel 400 to toggle the byte pointer. Once the dummy cycle is performed, at step 1610 the original access is performed to the DMA slave channel 400. Thus, the DMA slave logic 312 causes the DMA slave channel 400 to appear as having the address map of Table 1.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What we claim is:

1. A computer system, comprising:

a bus;

a processor coupled to said bus for providing cycles;

a main memory coupled to said bus;

a direct memory access (DMA) controller coupled to said bus, said DMA controller having a number of DMA channels, said DMA controller being capable of operating in a conventional mode and a distributed mode, said DMA controller having control signals from a control register shared among said number of DMA channels in said conventional mode, said DMA controller having separate control signals provided to each of said number of DMA channels in said distributed mode, each said separate control signal being independently accessible by said processor; and a floppy drive system coupled to said DMA controller, said floppy drive system for providing DMA requests to said DMA controller when a DMA transfer between said main memory and said floppy drive system is requested.

2. The computer system of claim 1, wherein said control register is a command register and said separate control signals include a controller enable signal and a DMA request sense signal.

3. The computer system of claim 1, wherein said control register is a mask register and said control signals include a mask signal to each of said DMA channels.

4. The computer system of claim 1, wherein said control register is a status register containing a terminal count indication and a DMA request indication for each of said DMA channels, said terminal count indication being reset during a status register read operation and wherein said status register further includes:

an individual reset circuit for each said terminal count indication, said individual reset circuits causing one terminal count indication to clear if status is read for a DMA channel corresponding to said one terminal count indication.

5. A computer system, comprising:

a bus;

a processor coupled to said bus for providing access cycles;

a main memory coupled to said bus;

a direct memory access (DMA) controller having an address generation register and a data pointer, said address generation register being two data sections in size, said data pointer for indicating which data section of said address generation register is being accessed, said data pointer toggling between odd and even address boundary positions after an access cycle;

a DMA bus interface coupled between said bus and said DMA controller, said DMA interface receiving said data pointer indication for determining whether said data pointer is pointing to an even or odd address boundary, said DMA bus interface adapted to receive an access cycle directed to said address generation register, said DMA bus interface aligning said data pointer according to said received access cycle; and a floppy drive system coupled to said DMA controller, said floppy drive system for providing DMA requests to said DMA controller when a DMA transfer between said main memory and said floppy drive system is requested.

6. The computer system of claim 5, wherein said DMA bus interface further comprises:

a decoder adapted to determine whether said access request is to an even or odd address boundary, said DMA bus interface providing a dummy read cycle to said DMA controller if said access is to an even boundary address and said data pointer is pointing to an odd address boundary and if said access is to an odd boundary address and said data pointer is pointing to an even address boundary.

7. A computer system emulating a cascading effect of two cascaded direct memory access (DMA) controllers, comprising:

a bus;

a processor coupled to said bus for providing cycles;

a main memory coupled to said bus;

a primary DMA controller coupled to said bus, said primary DMA controller having at least a first DMA channel, said primary DMA controller operable in a conventional mode and a distributed mode, said primary DMA controller having mask signals from a first mask register shared among each DMA channel of said primary DMA controller in the conventional mode, said primary DMA controller having separate mask signals for each DMA channel which are independently accessible in the distributed mode;

a secondary DMA controller coupled to said bus, said secondary DMA controller having at least a second DMA channel, said secondary DMA controller operable in a conventional mode and a distributed mode, said secondary DMA controller having mask signals from a second mask register shared among each DMA channel of said secondary DMA controller in the conventional mode, said secondary DMA controller having separate mask signals for each DMA channel which are independently accessible in the distributed mode, said second DMA channel being cascaded into said first DMA channel in the conventional mode, said second DMA channel being independent of said first DMA channel in the distributed mode;

a floppy drive system coupled to said second DMA channel, said floppy drive system requesting DMA transfers between said second DMA channel and said main memory; and a DMA master coupled to said bus for receiving access cycles intended for said primary and secondary DMA controllers, said DMA master including:

a set of tracking registers, each tracking register corresponding to a DMA channel, each tracking register for receiving a copy of changes to the corresponding mask register of the DMA channel;

a decoder coupled to said tracking registers, said decoder receiving access cycles intended for said mask registers and causing said tracking registers to be changed, each DMA channel having a tracking register; and a scheduler coupled to said decoder and said tracking registers, said scheduler receiving access cycles intended for said primary and secondary DMA controller and to passing said cycles to said DMA channels in said distributed mode, and wherein if said first DMA channel receives a mask indication, said decoder causes a copy of said mask indication to be stored in said tracking register corresponding to said first DMA channel, and said scheduler causes said at least a second DMA channel to be masked and said first DMA channel to be masked.

8. The computer system of claim 7, wherein if said first DMA channel receives an unmask indication, said decoder causes a copy of said mask indication to be stored in said tracking register corresponding to said first DMA channel, and said scheduler causes said mask register of said at least a second DMA channel to be restored from said tracking register corresponding to said at least a second DMA channel.

9. The computer system of claim 7, wherein while said first DMA channel is masked, access cycles masking said at least a second DMA channel cause said decoder to store a copy of said mask changes in said tracking registers.

10. The computer system of claim 7, wherein if said second DMA channel is masked, said DMA transfer requests from said floppy drive system are ignored.

11. The computer system of claim 7, where if said DMA controllers are in the distributed mode and a master clear command is directed to one of said DMA channels, only said mask register corresponding to said one DMA channel is cleared.

12. A computer system emulating a cascading effect of two cascaded direct memory access (DMA) controllers, comprising:

a bus;

a processor coupled to said bus for providing cycles;

a main memory coupled to said bus;

a primary DMA controller coupled to said bus, said primary DMA controller having at least a first DMA channel, said primary DMA controller operable in a conventional mode and a distributed mode, said primary DMA controller having disable signals from a first command register shared among each DMA channel of said primary DMA controller in the conventional mode, said primary DMA controller having separate disable signals for each DMA channel which are independently accessible in the distributed mode;

a secondary DMA controller coupled to said bus, said secondary DMA controller having at least a second DMA channel, said secondary DMA controller operable in a conventional mode and a distributed mode, said secondary DMA controller having disable signals from a second command register shared among each DMA channel of said secondary DMA controller in the conventional mode, said secondary DMA controller having separate disable signals for each DMA channel which are independently accessible in the distributed mode, said second DMA channel being cascaded into said first DMA channel in the conventional mode, said second DMA channel being independent of said first DMA channel in the distributed mode;

a floppy drive system coupled to said second DMA channel, said floppy drive system requesting DMA transfers between said second DMA channel and said main memory; and a DMA master coupled to said bus for receiving access cycles intended for said primary and secondary DMA controllers, said DMA master including:

a set of tracking registers, each tracking register corresponding to a DMA channel, each tracking register for receiving a copy of changes to the corresponding command register of the DMA channel;

a decoder coupled to said tracking registers, said decoder receiving access cycles intended for said command registers and causing said tracking registers to be changed, each DMA channel having a tracking register; and a scheduler coupled to said decoder and said tracking registers, said scheduler receiving access cycles intended for said primary and secondary DMA controller and passing said cycles to said DMA channels in the distributed mode, and wherein if said first DMA channel receives a disable indication, said decoder causes a copy of said disable indication to be stored in said tracking register corresponding to said first DMA channel, and said scheduler causes said at least a second DMA channel to be disabled and said first DMA channel to be disabled.

13. The computer system of claim 12, wherein if said first DMA channel receives an enable indication, said decoder causes a copy of said enable indication to be stored in said tracking register corresponding to said first DMA channel, and said scheduler causes said command register of said at least a second DMA channel to be restored from said tracking register corresponding to said at least a second DMA channel.

14. The computer system of claim 12, wherein while said first DMA channel is disabled, access cycles enabling and disabling said at least a second DMA channel cause said decoder to store a copy of said disable changes in said tracking registers.

15. The computer system of claim 12, wherein if said second DMA channel is enabled, said DMA transfer requests from said floppy drive system are ignored.

16. The computers system of claim 12, where if said DMA controllers are in the distributed mode and a master clear command is directed to one of said DMA channels, only said command register corresponding to said one DMA channel is enabled.

17. A method of isolating channels of a direct memory access (DMA) controller in a computer system, the DMA controller having control registers shared among multiple channels of the DMA controller, each control register having control bits shared among said multiple channels of the DMA controller, the DMA controller having a first DMA channel coupled to memory and a floppy drive, the method comprising the step of:

(a) providing an individual control bit to each of said DMA channels for each said shared control bit, each said individual control bit being independently accessible; and (b) performing a DMA transfer between said floppy drive and said memory as a result of an access cycle to a control bit corresponding to said first DMA channel.

18. The method of claim 17, wherein said control register is a command register and said control bits include a controller enable bit and a DMA request sense bit, and wherein step (a) further comprises the step of:

(c) providing an individual controller enable bit and DMA request sense bit to each of said DMA channels.

19. The method of claim 17, wherein said control register is a mask register and said control bits include a mask bit, and wherein step (a) further includes the step of:

(d) providing an individual mask bit to each of said DMA channels.

20. The method of claim 17, wherein said control register is a status register containing a terminal count indication and DMA request indication for each of said DMA channels, said terminal count indication being reset during a status register read operation, and wherein step (a) further includes the step of:

(e) providing an individual reset to each said terminal count indication.

21. A method of accessing a direct memory access (DMA) controller in a computer system, the DMA controller having an address generation register and a data pointer, said address generation register being two data sections in size, said data pointer for indicating which data section of said address generation register is being accessed, said data pointer toggling between odd and even address boundary positions after an access cycle, the DMA controller further having a first DMA channel coupled to memory and a floppy drive for performing DMA transfers, the method comprising the steps of:

(a) receiving an cycle requesting access to a data section of said address generation register;

(b) determining whether said request access cycle is to an even or odd address boundary;

(c) determining whether said data pointer is pointing to an even or odd address boundary;

(d) running a dummy read cycle if said access is to an even boundary address and said data pointer is pointing to an odd address boundary and if said access is to an odd boundary address and said data pointer is pointing to an even address boundary;

(e) passing said request access cycle to said DMA controller; and (f) performing a DMA transfer between said floppy drive and said memory as a result of said request access cycle.

22. The method of claim 21, wherein said data is a byte in size and said data pointer points to a byte.

23. A method of masking isolated direct memory access (DMA) channels in a computer system to emulate the cascading effect of a secondary DMA controller cascaded into a primary DMA controller, the primary and secondary DMA controllers each including at least one DMA slave channel, the primary DMA controller having a first DMA slave channel, the secondary DMA controller having a second DMA slave channel cascaded into said first DMA slave channel, said primary and secondary DMA slave channels receiving cycles from a DMA master, said second DMA slave channel coupled to a floppy drive and memory for performing DMA transfers, the method comprising the steps of:

(a) receiving a mask indication to mask off said first DMA slave channel;

(b) masking off said first DMA slave channel after receipt of said first DMA slave channel mask indication;

(c) masking off each DMA slave channel of said secondary DMA controller after receipt of said first DMA slave channel mask indication;

(d) ignoring DMA transfer requests from said floppy drive after masking said second DMA slave channel; and (e) storing mask indications of each DMA slave channel in a tracking register, said tracking registers of said secondary DMA controller not tracing changes to said mask indications of said secondary DMA controller occurring as a result of mask changes to said first DMA slave channel.

24. The method of claim 23, further comprising the step of:

(f) receiving an unmask indication to unmask said first DMA slave channel;

(g) unmasking said first DMA slave channel after receipt of said first DMA slave channel unmask indication; and (h) restoring mask indications from said tracking registers to each DMA slave channel of said secondary DMA controller after receipt of said first DMA slave channel unmask indication.

25. A method of disabling isolated direct memory access (DMA) channels in a computer system to emulate the cascading effect of a secondary DMA controller cascaded into a primary DMA controller, the primary and secondary DMA controllers each including at least one DMA slave channel, the primary DMA controller having a first DMA slave channel, the secondary DMA controller having a second DMA slave channel cascaded into said first DMA slave channel, said primary and secondary DMA slave channels receiving cycles from a DMA master, said second DMA slave channel coupled to a floppy drive and memory for performing DMA transfers, the method comprising the steps of:

(a) receiving a command to disable said first DMA slave channel;

(b) disabling said first DMA slave channel after receipt of the disable command;

(c) disabling each DMA slave channel of said secondary DMA controller after receipt of the disable command;

(d) ignoring DMA transfer requests from said floppy drive after disabling said second DMA slave channel; and (e) storing command values of each DMA slave channel in a tracking register, said tracking registers of said secondary DMA controller not tracking changes to said command values of said secondary DMA controller occurring as a result of commands to said first DMA slave channel.

26. The method of claim 25, further comprising the steps of (f) receiving a command to enable said first DMA slave channel;

(g) enabling said first DMA slave channel after receipt of the enable command; and (h) restoring command values from said tracking registers to each DMA slave channel of said secondary DMA controller after receipt of the disable command.

27. A method of clearing isolated direct memory access (DMA) channels in a computer system to emulate the cascading effect of a secondary DMA controller cascaded into a primary DMA controller, the primary and secondary DMA controllers each including at least one DMA slave channel, the primary DMA controller having a first DMA slave channel, the secondary DMA controller having a second DMA slave channel cascaded into said first DMA slave channel, said primary and secondary DMA slave channels receiving cycles from a DMA master, said second DMA slave channel coupled to a floppy drive and memory for performing DMA transfers, the method comprising the steps of:

(a) receiving a command to clear said primary DMA controller;

(b) masking and enabling said first DMA slave channel after receipt of the clear command;

(c) masking each DMA slave channel of said secondary DMA controller after receipt of the clear command; and (d) ignoring DMA transfer requests from said floppy drive after masking said second DMA slave channel;

(e) storing command and mask values of each DMA slave channel in a tracking registers, said tracking registers of said secondary DMA controller not tracking changes to said command and mask values of said secondary DMA controller occurring as a result of commands and mask changes to said first DMA slave channel.

28. The method of claim 27, further comprising the steps of:

(f) receiving an unmask indication to unmask said first DMA slave channel;

(g) providing a cycle to unmask said first DMA slave channel after receipt of said first DMA slave channel unmask indication; and (h) restoring mask values from said tracking registers to each DMA slave channel of said secondary DMA controller after receipt of said first DMA slave channel unmask indication.

* * * * *

UNITED STATES PATENT AND TRADEMARK OFFICE
CERTIFICATE OF CORRECTION

PATENT NO. : 5,838,993
DATED : 11/17/98
INVENTOR(S) : DWIGHT D. RILEY, ROBERT C. ELLIOTT

It is certified that error appears in the above-identified patent and that said Letters Patent is hereby corrected as shown below:

Claim 12, line 21, column 41, please delete "t racking" and insert therefor --tracking--.

Claim 21, line 31, column 42, please delete "an" and insert therefor --a--.

Claim 26, line 2, column 44, please insert --:-- after "of".

Signed and Sealed this

Thirteenth Day of April, 1999

Attest:

Q. TODD DICKINSON

*Attesting Officer*          *Acting Commissioner of Patents and Trademarks*